(12) United States Patent
Yamanaka et al.

(10) Patent No.: US 7,087,667 B2
(45) Date of Patent: Aug. 8, 2006

(54) FLAME-RETARDANT RESIN COMPOSITION AND MOLDED ARTICLE THEREFROM

(75) Inventors: Katsuhiro Yamanaka, Chiyoda-ku (JP); Yutaka Taketani, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 10/476,390

(22) PCT Filed: May 14, 2002

(86) PCT No.: PCT/JP02/04659

§ 371 (c)(1),
(2), (4) Date: Oct. 31, 2003

(87) PCT Pub. No.: WO02/092690

PCT Pub. Date: Nov. 21, 2002

(65) Prior Publication Data

US 2004/0127611 A1 Jul. 1, 2004

(30) Foreign Application Priority Data

May 15, 2001 (JP) ............................. 2001-144478
Sep. 17, 2001 (JP) ............................. 2001-281268
Nov. 13, 2001 (JP) ............................. 2001-347212

(51) Int. Cl.
*C08K 5/526* (2006.01)
*C08K 5/5333* (2006.01)

(52) U.S. Cl. ..................... 524/116; 524/117; 524/119; 524/120; 524/486

(58) Field of Classification Search ........ 524/116–117, 524/119–120, 486; 558/77
See application file for complete search history.

(56) References Cited

U.S. PATENT DOCUMENTS

| | | | |
|---|---|---|---|
| 3,702,878 A | 11/1972 | Saito et al. | |
| 3,839,506 A | 10/1974 | Hechenbleikner et al. | |
| 3,866,405 A | 2/1975 | Knopka | |
| 4,257,931 A | 3/1981 | Granzow | |
| 5,288,869 A | 2/1994 | Giroldini et al. | |
| 5,356,967 A | 10/1994 | Böhshar et al. | |
| 6,469,095 B1 * | 10/2002 | Gareiss et al. | 524/504 |

FOREIGN PATENT DOCUMENTS

| | | |
|---|---|---|
| EP | 1 059 329 | 12/2000 |
| FR | 2 253 024 | 6/1975 |
| GB | 1 515 223 | 6/1978 |
| GB | 2 003 888 | 3/1979 |
| JP | 50-58319 | 5/1975 |
| JP | 52-12329 | 1/1977 |
| JP | 58-108248 | 6/1983 |
| JP | 7-126498 | 5/1995 |
| JP | 7-278267 | 10/1995 |
| JP | 8-208884 | 8/1996 |
| JP | 2000-103972 | 4/2000 |
| JP | 2000-103973 | 4/2000 |
| JP | 2002-37973 | 2/2002 |

* cited by examiner

*Primary Examiner*—Peter Szekely
(74) *Attorney, Agent, or Firm*—Wenderoth, Lind & Ponack, L.L.P.

(57) ABSTRACT

A flame retardant resin composition consisting essentially of:
(A) 100 parts by weight of the total of resin components (components A) which include at least 60 wt % of an aromatic polyester resin;
(B) an organic phosphorus compound (component B-1) represented by the following general formula (1) and having an acid value of 0.7 mgKOH/g or less or an organic phosphorus compound (component B-2) represented by the following general formula (2);
(C) 0 to 50 parts by weight of a flame retardancy improving resin (component C); and
(D) 0 to 200 parts by weight of a filler (component D), and a molded article thereof.

Wherein, when the organic phosphorus compound is the component B-1, the amount of the component B-1 is 1 to 100 parts by weight and when the organic phosphorus compound is the component B-2, the component B-2 is used in combination with a biscumyl compound (component B-3), the amount of the component B-2 is 5 to 3.0 parts by weight, and the amount of the component B-3 is 0.01 to 5 parts by weight.

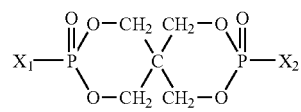

(1)

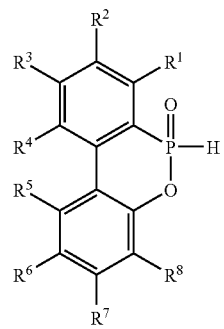

(2)

According to the present invention, there can be obtained a flame retardant polyester resin composition which contains substantially no halogen and has UL-94 V-2 flame retardancy or V-0 flame retardancy under favorable conditions as well as a molded article thereof.

31 Claims, No Drawings

FLAME-RETARDANT RESIN COMPOSITION AND MOLDED ARTICLE THEREFROM

DETAILED DESCRIPTION OF THE INVENTION

1. Field of the Invention

The present invention relates to a flame retardant polyester resin composition having high flame retardancy and excellent physical properties and to molded articles formed therefrom. More specifically, it relates to a substantially halogen-free flame retardant polyester resin composition which comprises a specific organic phosphorus compound as a flame retardant and to molded articles formed therefrom.

2. Prior Art

Thermoplastic aromatic polyester resins including polybutylene terephthalate (to be abbreviated as PBT hereinafter) are widely used as molded articles for use in electric and electronic, mechanical part and automobile fields as they have excellent mechanical properties, heat resistance, chemical resistance and the like.

Among these application fields are a large number of fields which require flame retardancy and there have been provided resins which comprise a halogen-containing compound and an antimony compound as a flame retardant and a flame retardant aid, respectively, to achieve flame retardancy.

However, a decomposed product of a halogen-containing flame retardant may corrode a metal contained in an electric product and further some halogen-containing flame retardants are now in question from the viewpoint of their influence upon environment. Therefore, a strong trend toward use of halogen-free resin molded articles is seen mainly in Europe. Demand for halogen-free flame retardants is growing and the development of a halogen-free flame retardant to be contained in resins is under way vigorously. Technologies for flame retarding polyester resins with halogen-free flame retardants have been reported but are not implemented yet because they still have various problems to be solved.

In general, a phosphorus-containing compound is often used as a halogen-free flame retardant, as exemplified by phosphates such as red phosphorus and triphenyl phosphate (to be abbreviated as TPP hereinafter) in the field of the present invention. However, a polyester resin such as PBT has a relatively high processing temperature and red phosphorus generates a highly toxic phosphine gas. When red phosphorus is used, the resulting composition becomes brown due to red phosphorus, resulting in its limited use. Meanwhile, low-molecular weight TPP has a bleed-out problem and an aromatic phosphate typified by TPP generally has a plasticizing effect, thereby greatly reducing the heat resistance of the obtained composition.

Known documents on technologies for improving flame retardant resin compositions comprising a phosphorus-containing compound as a flame retardant are introduced hereinbelow. For example, JP-A 7-126498 (the term "JP-A" as used herein means an. "unexamined published Japanese patent application") discloses a halogen-free flame retardant for a polyester resin, which is obtained by melt reacting a polyester resin, an epoxy compound having two or more epoxy groups in the molecule and a phenolic resin and/or phosphorus-, nitrogen- or boron-based compound having a functional group which can react with an epoxy group. JP-A 7-278267 discloses a flame retardant polyester resin composition which comprises 5 to 50 parts by weight of the above halogen-free flame retardant and 100 parts by weight of a polyester resin. However, the above resin composition is still unsatisfactory in terms of flame retardancy, inferior in fluidity and economically disadvantageous.

JP-A 8-208884 discloses a flame retardant resin composition obtained by adding a phosphorus-containing compound (specifically triphenyl phosphate) such as a phosphate or phosphate and an ortho- or para-substituted phenolic resin to a thermoplastic resin such as polystyrene or polyester. This resin composition has problems such as bleed-out and a reduction in heat resistance and cannot achieve sufficiently high flame retardancy.

JP-B 2-37370 (the term "JP-B" as used herein means an "examined Japanese patent publication") discloses a flame retardant polyester resin composition which comprises 99 to 34 parts by weight of a thermoplastic polyester resin having a softening point of 150° C. or higher, such as polyethylene terephthalate, 1 to 25 parts by weight of red phosphorus coated with a thermosetting resin and 10 to 55 parts by weight of a reinforcing filler. However, this resin composition has problems such as coloring and the generation of phosphine gas during molding as described above.

Further, JP-A 50-58319 discloses a flame retardant polyester fiber composition which comprises a fiber forming linear polyester, aryl spirophosphate and halogen-containing flame retardant containing at least 40% of chlorine atom or bromine atom. This publication shows the flame retardancy of a fiber prepared by blending polyethylene terephthalate with an aryl spirophosphate and a halogen-containing compound as flame retarding components.

JP-A 52-12329 (German Patent 2630693 and English Patent 1515223) teaches that flame retardancy is developed by blending a specific organic phosphorus-containing compound with a polyester fiber. More specifically, the publication discloses an example in which a fiber is obtained by mixing polyethylene terephthalate with a specific organic phosphorus compound and a fabric formed of the fiber has slightly improved flame retardancy (for example, oxygen index). The technology disclosed by this publication merely teaches the flame retardation of a polyethylene terephthalate fiber.

U.S. Pat. No. 3,866,405 discloses a flame retardant fiber composition which comprises a specific polyester resin and a halogen-containing spirodiphosphate. This publication shows the flame retardancy of a fiber obtained by blending a spirodiphosphate containing elemental halogen with a polyethylene naphthalate resin. However, this US Patent relates to a fiber and a halogen-containing flame-retardant is used, thus involving an environmental problem as, described above, though improvement in the flame retardancy of the polyester fiber is seen.

U.S. Pat. No. 4,257,931 discloses a flame retardant resin composition which comprises a polyester resin, melamine pyrophosphate and organic cyclic phosphorus compound. In this publication, a high flame retarding effect is obtained by using the above two flame retardants. Although this flame retarding effect is mainly obtained from the melamine pyrophosphate, when this melamine pyrophosphate is used, the appearance of a molded article of the composition becomes poor. Therefore, it is difficult to put this composition to practical use.

JP-A 2000-103972 discloses a composition obtained by flame retarding a thermoplastic resin such as styrene-based resin, polyester resin, polyamide resin or polycarbonate resin. This publication teaches that two flame retardants consisting of an aromatic phosphate and a specific phosphorus compound are used in specific amounts and that a radical generating agent or phenolic resin is used in combination with these flame retardants. However, as flame retardancy achieved by the composition of this publication is V-2, high flame retardancy is not obtained yet. Since use of an aromatic phosphate is essential to this composition, a bleed-out problem arises and a molded article of the composition deteriorates in hydrolytic resistance.

JP-A 2000-103973 discloses a flame retardant resin composition prepared by blending a thermoplastic resin with a specific phosphorus compound and a phenolic resin as essential flame retardants and a flame retardant resin composition prepared by further blending a fluorine-containing resin or a radical generating agent with this composition. However, the composition of this publication attains V-0 flame retardancy when it comprises ABS resin, AS resin, PPE resin, polystyrene resin or polycarbonate resin. There is no description in this publication of a flame retardant resin composition comprising a polyester resin.

Problems to be Solved by the Invention

It is a first object of the present invention to provide a polyester resin composition which has high flame retardancy and good balance between heat resistance and mechanical properties useful for industrial purposes as well as molded articles formed therefrom.

It is a second object of the present invention to provide a polyester resin composition which can attain high flame retardancy, that is, UL-94 V-2 or higher, or V-0 or higher in favorable conditions substantially without containing halogen as well as molded articles formed therefrom.

It is a third object of the present invention to provide a flame retardant polyester resin composition which can be advantageously used in home electric appliance parts, electric and electronic parts, mechanical parts and auto parts as well as molded articles formed therefrom.

It is a fourth object of the present invention to provide a flame retardant composition having excellent transparency.

It is a fifth object of the present invention to provide a flame retardant which is a novel organic phosphorus compound.

Means to Solve the Problems

According to researches conducted by the inventors of the present invention, the above objects of the present invention are attained by a flame retardant resin composition consisting essentially of:

(A) 100 parts by weight of the total of resin components (components A) which include at least 60 wt % of an aromatic polyester resin;
(B) an organic phosphorus compound (component B-1) represented by the following general formula (1) and having an acid value of 0.7 mgKOH/g or less or an organic phosphorus compound (component B-2) represented by the following general formula (2);
(C) 0 to 50 parts by weight of a flame retardancy improving resin (component C); and
(D) 0 to 200 parts by weight of a filler (component D), and molded articles formed therefrom.

When the organic phosphorus compound is component B-1, the amount of the component B-1 is 1 to 100 parts by weight. When the organic phosphorus compound is component B-2, the component B-2 is used in combination with a biscumyl compound (component B-3) represented by the following general formula (3), the amount of the component B-2 is 5 to 30 parts by weight, and the amount of the component B-3 is 0.01 to 5 parts by weight.

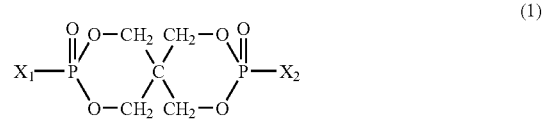

(wherein $X_1$ and $X_2$ are the same or different and each an aromatic substituted alkyl group represented by the formula -(AL)-(Ar)$_n$ (AL is a branched or linear aliphatic hydrocarbon group having 1 to 5 carbon atoms, Ar is a phenyl group, napthyl group or anthryl group, n is an integer of 1 to 3, and Ar may be bonded to any carbon atom of AL).)

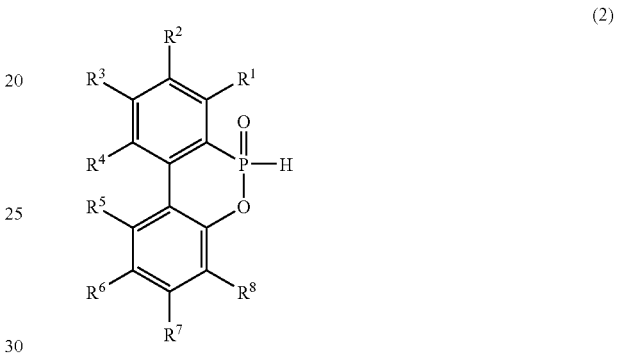

(wherein $R^1$ to $R^8$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y— (Y is —O—, —S— or alkylene group having 1 to 8 carbon atoms, and $Ar^3$ is an aryl group having 6 to 15 carbon atoms).)

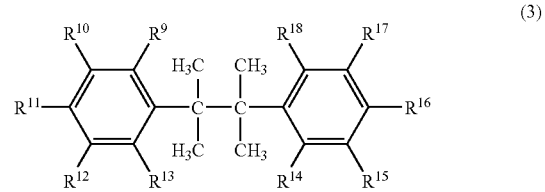

(wherein $R^9$ to $R^{18}$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y— (Y is —O—, —S— or alkylene group having 1 to 8 carbon atoms, and $Ar^3$ is an aryl group having 6 to 15 carbon atoms).)

According to the present invention, there is obtained a flame retardant polyester resin composition which has excellent mechanical properties and at least V-2 flame retardancy, or V-0 flame retardancy in favorable conditions.

The flame retardant resin composition of the present invention will be described in more detail hereinunder.

As for the resin components in the present invention, an aromatic polyester resin must be the main component among the resin components (components A). That is, the aromatic polyester resin (component A-1) may be contained in an amount of preferably at least 60 wt %, more preferably at least 70 wt %, particularly preferably at least 80 wt %. Another resin (component A-2) may be contained in an amount of less than 40 wt %, preferably less than 30 wt %, particularly preferably less than 20 wt % of the total of all the components A. This another resin will be described in detail hereinafter.

The aromatic polyester resin (component A-1) out of the resin components (components A) of the present invention is a polyester which comprises an aromatic dicarboxylic acid as the main dicarboxylic acid component and an aliphatic diol having 2 to 10 carbon atoms as the main glycol component. The aromatic dicarboxylic acid is contained in an amount of preferably 80 mol % or more, more preferably 90 mol % or more based on the total of all the dicarboxylic acid components. The aliphatic diol having 2 to 10 carbon atoms is contained in an amount of preferably 80 mol % or more, more preferably 90 mol % or more based on the total of all the glycol components.

Preferred examples of the aromatic dicarboxylic acid component include terephthalic acid, isophthalic acid, phthalic acid, methylterephthalic acid, methylisophthalic acid and 2,6-naphthalenedicarboxylic acid. They may be used alone or in combination of two or more. Dicarboxylic acids other than the aromatic dicarboxylic acids include aliphatic dicarboxylic acids and alicyclic dicarboxylic acids such as adipic acid, sebacic acid, decanedicarboxylic acid, azelaic acid, dodecanedicarboxylic acid and cyclohexanedicarboxylic acid.

Examples of the aliphatic diol having 2 to 10 carbon atoms include aliphatic diols such as ethylene glycol, trimethylene glycol, tetramethylene glycol, hexamethylene glycol and neopentyl glycol, and alicyclic diols such as 1,4-cyclohexane dimethanol. Glycols other than the aliphatic diols having 2 to 10 carbon atoms include p,p'-dihydroxyethoxybisphenol A and polyoxyethylene glycol.

The aromatic polyester resin (component A-1) is preferably a polyester having an ester unit which comprises at least one dicarboxylic acid selected from terephthalic acid and 2,6-naphthalenedicarboxylic acid as the main dicarboxylic acid component and at lest one diol selected from ethylene glycol, trimethylene glycol and tetramethylene glycol as the main diol component.

The aromatic polyester resin (component A-1) is preferably at least one selected from the group consisting of polyethylene terephthalate resin, polybutylene terephthalate resin, polyethylene naphthalate resin, polybutylene naphthalate resin, polycyclohexanedimethyl terephthalate resin, polytrimethylene terephthalate resin and polytrimethylene naphthalate resin.

It is particularly preferably at least one selected from the group consisting of polyethylene terephthalate resin, polybutylene terephthalate resin and polyethylene naphthalate resin. It is ideally polybutylene terephthalate resin.

The aromatic polyester resin (component A-1) of the present invention may be a polyester elastomer which comprises the above recurring unit as the main recurring unit of a hard segment.

The soft segment of a polyester elastomer comprising tetramethylene terephthalate or tetramethylene-2,6-naphthalene dicarboxylate as the main recurring unit of a hard segment is a polyester or polycaprolactone which comprises at least one dicarboxylic acid selected from terephthalic acid, isophthalic acid, sebacic acid and adipic acid and at least one diol selected from the group consisting of a long-chain diol having 5 to 10 carbon atoms and $H(OCH_2CH_2)_iOH$ (i=2 to 5) and which has a melting point of 100° C. or lower or noncrystallinity.

The main component is a component which is contained in an amount of 80 mol % or more, preferably 90 mol % or more based on the total of all the dicarboxylic acid components or all the glycol components, and the main recurring unit is contained in an amount of 80 mol % or more, preferably 90 mol % or more based on the total of all the recurring units.

As for the molecular weight of the aromatic polyester resin in the present invention, the aromatic polyester resin may have an intrinsic viscosity that enables it to be used as an ordinary molded article, preferably 0.5 to 1.6 dl/g, more preferably 0.6 to 1.5 dl/g when measured in orthochlorophenol at 35° C.

It is advantageous that the aromatic polyester resin have a terminal carboxyl group (—COOH) in an amount of 1 to 60 equivalents/t (1 ton of a polymer). The amount of this terminal carboxyl group can be obtained by a potential difference titration method using an m-cresol solution of the aromatic polyester resin and an alkali solution.

The constituent resins (components A) of the present invention may include another thermoplastic resin (component A-2) other than the above aromatic polyester resin (component A-1). As described above, the amount of the another resin (component A-2) is less than 40 wt %, preferably less than 30 wt % based on the total of all the components A.

The thermoplastic resin as the component A-2 is at least one selected from the group consisting of polyphenylene ether resin (PPE), polycarbonate resin (PC), polyamide resin (PA), polyolefin resin (PO), polystyrene-based resin, polyphenylene sulfide resin (PPS) and polyether imide resin (PEI). Out of these components A-2, polyphenylene ether resin (PPE), polycarbonate resin (PC), polyamide resin (PA), polyolefin resin (PO) and polystyrene-based resin are preferred.

A description is subsequently given of the thermoplastic resin as the component A-2.

As the polyphenylene ether resin as the component A-2 may be used what is generally known as PPE resin. Examples of the PPE resin include homopolymers and/or copolymers such as (2,6-dimethyl-1,4-phenylene)ether, (2,6-diethyl-1,4-phenylene)ether, (2,6-dipropyl-1,4-phenylene)ether, (2-methyl-6-ethyl-1,4-phenylene)ether, (2-methyl-6-propyl-1,4-phenylene)ether and (2,3,6-trimethyl-1,4-phenylene)ether. Poly(2,6-dimethyl-1,4-phenylene)ether is particularly preferred. Copolymers obtained by graft polymerizing the above PPE with a styrene compound may also be used. The process for producing PPE is not particularly limited. For instance, PPE can be easily manufactured by oxidation polymerizing 2,6-xylenol in the presence of a complex of a cuprous salt and an amine as a catalyst in accordance with the process of U.S. Pat. No. 3,306,874.

The reduced viscosity ηsp/C (0.5 g/dl, toluene solution, measured at 30° C.) which is an index of the molecular weight of the PPE resin is 0.2 to 0.7 dl/g, preferably 0.3 to 0.6 dl/g. PPE resin having a reduced viscosity within the above range has good balance between moldability and mechanical properties. The reduced viscosity of the PPE resin can be easily adjusted by controlling the amount of a catalyst and the like for the production of PPE.

The polycarbonate-based resin (PC) as the component A-2 is obtained by an interfacial polymerization reaction between a dihydroxyaryl compound and phosgene in the presence of a solvent such as methylene chloride or an ester exchange reaction between a dihydroxyaryl compound and diphenyl carbonate. It is typically a polycarbonate obtained by a reaction between 2,2'-bis(4-hydroxyphenyl)propane and phosgene.

Examples of the dihydroxyaryl compound as a raw material of the polycarbonate include bis(4-hydroxyphenyl) methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxyphenyl-3-methylphenyl)propane, 2,2'-bis(4-hydroxyphenyl-3-t-butylphenyl)propane, 2,2'-bis(3,5-dimethyl-4-hydroxyphenyl)propane, 2,2'-bis(4-hydroxy-3-cyclohexylphenyl) propane, 2,2'-bis(4-hydroxy-3-methoxyphenyl)propane, 1,1'-bis(4-hydroxyphenyl)cyclopentane, 1,1'-bis(4-hydroxyphenyl)cyclohexane, 1,1'-bis(4-hydroxyphenyl)cyclododecane, 4,4'-dihydroxyphenyl ether, 4,4'-dihydroxy-3,3'-dimethylphenyl ether, 4,4'-dihydroxydiphenyl sulfide, 4,4'-dihydroxy-3,3'-dimethyldiphenyl sulfide, 4,4'-dihydroxydiphenyl sulfoxide, 4,4'-dihydroxydiphenyl sulfone and bis(4-dihydroxydiphenyl)ketone. These dihydroxyaryl compounds may be used alone or in combination of two or more.

The dihydroxyaryl compound is preferably a bisphenol which forms an aromatic polycarbonate having high heat resistance, bis(hydroxyphenyl)alkane such as 2,2'-bis(4-hydroxyphenyl)propane, bis(hydroxyphenyl)cycloalkane such as bis(4-hydroxyphenyl)cyclohexane, dihydroxydiphenyl sulfide, dihydroxydiphenyl sulfone or dihydroxydiphenyl ketone. The dihydroxyaryl compound is particularly preferably 2,2'-bis(4-hydroxyphenyl)propane which forms a bisphenol A aromatic polycarbonate.

Part of bisphenol A may be substituted by another dihydroxyaryl compound to produce the bisphenol A aromatic polycarbonate as far as it does not impair heat resistance and mechanical strength.

The molecular weight of the polycarbonate resin does not need to be particularly limited but if it is too low, the strength of the polycarbonate resin becomes unsatisfactory and if it is too high, the melt viscosity becomes too high, thereby making it difficult to mold the polycarbonate resin. Therefore, the viscosity average molecular weight of the polycarbonate resin is generally 10,000 to 50,000, preferably 15,000 to 30,000. The viscosity average molecular weight (M) as used herein is obtained by inserting a specific viscosity ($\eta_{sp}$) obtained from a solution of 0.7 g of a polycarbonate resin dissolved in 100 ml of methylene chloride at 20° C. into the following expression.

$$\eta_{sp}/C=[\eta]+0.45\times[\eta]^2 C$$

$$[\eta]=1.23\times 10^{-4} M^{0.83}$$

$$C=0.7$$

($[\eta]$ is an intrinsic viscosity and C is the concentration of the polymer)

A brief description is given of the basic means of producing the polycarbonate resin. In the interfacial polycondensation method (solution polymerization method) using phosgene as a carbonate precursor, a reaction is generally carried out in the presence of an acid binder and an organic solvent. Examples of the acid binder include alkali metal hydroxides such as sodium hydroxide and potassium hydroxide, and amine compounds such as pyridine. Examples of the organic solvent include halogenated hydrocarbons such as methylene chloride and chlorobenzene. A catalyst such as a tertiary amine or quaternary ammonium compound may be used to promote the reaction, and a terminal capping agent such as an alkyl-substituted phenol exemplified by phenol and p-tert-butylphenol is desirably used as a molecular weight control agent. The reaction temperature is generally 0 to 40° C., the reaction time is several minutes to 5 hours, and pH during the reaction is preferably maintained at 10 or more. All the terminals of the obtained molecular chain do not need to have a structure derived from the terminal capping agent.

In the ester exchange reaction (melt polymerization method) using a carbonic diester as a carbonate precursor, a diphenol and a carbonic diester are stirred in a predetermined ratio under heating in the presence of an inert gas to distill out the formed alcohol or phenol. The reaction temperature which changes according to the boiling point or the like of the formed alcohol or phenol is generally 120 to 350° C. The reaction is completed while the alcohol or phenol formed under vacuum from the beginning of the reaction is distilled off. A terminal capping agent is added together with the diphenol in the initial stage of the reaction or during the reaction. A catalyst used for a known ester exchange reaction can be used to promote the reaction. Examples of the carbonic diester used for this ester exchange reaction include diphenyl carbonate, dinaphthyl carbonate, dimethyl carbonate, diethyl carbonate and dibutyl carbonate. Out of these, diphenyl carbonate is particularly preferred.

The polyamide resin (PA) as the component A-2 is, for example, a ring-opening polymer of a cyclic lactam, a polymer of an aminocarboxylic acid or a polycondensate of a dibasic acid and a diamine. Specific examples of the polyamide resin include aliphatic polyamides such as nylon 6, nylon 66, nylon 46, nylon 610, nylon 612, nylon 11 and nylon 12, aliphatic-aromatic polyamides such as poly(metaxylene adipamide), poly(hexamethylene terephthalamide), poly(nonamethylene terephthalamide), poly(hexamethylene isophthalamide) and poly(tetramethylene isophthalamide), and copolymers and mixtures thereof. The polyamide which can be used in the present invention is not limited to a particular kind.

Although the molecular weight of the polyamide resin is not particularly limited, the relative viscosity measured in 98% sulfuric acid at a concentration of 1% and 25° C. of the polyamide resin is 1.7 to 4.5, preferably 2.0 to 4.0, particularly preferably 2.0 to 3.5.

The polyolefin resin as the component A-2 is a homopolymer or copolymer of an olefin such as ethylene, propylene or butane, or a copolymer of an olefin and a monomer copolymerizable with the olefin. Specific examples of the polyolefin resin include polyethylene, polypropylene, ethylene-vinyl acetate copolymer, ethylene-ethyl acrylate copolymer, ethylene-acrylic acid copolymer, ethylene-methyl methacrylate copolymer, ethylene-α-olefin copolymer, ethylene-propylene copolymer and ethylene-butene copolymer. The molecular weight of the polyolefin resin is not particularly limited but a polyolefin resin having a higher molecular weight has higher flame retardancy.

The styrene-based resin as the component A-2 is a homopolymer or copolymer of an aromatic vinyl monomer such as styrene, α-methylstyrene or vinyl toluene, copolymer of one of the above monomers and a vinyl monomer such as acrylonitrile or methyl methacrylate, or graft polymer obtained by graft polymerizing diene-based rubber such as polybutadiene, ethylene•propylene-based rubber or acrylic rubber with styrene and/or styrene derivative, or styrene and/or styrene derivative with another vinyl monomer. Specific examples of the styrene-based resin include polystyrene, high-impact polystyrene (HIPS), acrylonitrile•styrene copolymer (AS resin), acrylonitrile•butadiene•styrene copolymer (ABS resin), methyl methacrylate•butadiene•styrene copolymer (MBS resin), methyl methacrylate•acrylonitrile•butadiene•styrene copolymer (MABS resin), acrylonitrile•acrylic rubber•styrene copolymer (AAS resin), acrylonitrile•ethylene propylene-based rubber•styrene copolymer (AES resin), and mixtures thereof. From the viewpoint of impact resistance, a rubber modified styrene-based resin is preferred and is a polymer which contains rubber-like polymer particles dispersed in a matrix composed of a vinyl aromatic polymer and which is obtained by the known bulk polymerization, bulk suspension polymerization, solution polymerization or emulsion polymerization of an aromatic vinyl monomer or a monomer mixture of an aromatic vinyl monomer and a vinyl monomer in the presence of a rubber-like polymer.

Examples of the rubber-like polymer include diene-based rubbers such as polybutadiene, poly(styrene-butadiene) and poly(acrylonitrile-butadiene), saturated rubbers obtained by hydrogenating the above diene-based rubbers, acrylic rubbers such as isoprene rubber, chloroprene rubber and butyl polyacrylate, and ethylene-propylene-diene monomer terpolymer (EPDM). Diene-based rubbers are particularly preferred.

The aromatic vinyl monomer as an essential component of a graft copolymerizable monomer mixture which is polymerized in the presence of the above rubber-like polymer is, for example, styrene, α-methylstyrene or paramethylstyrene and the most preferably styrene.

The vinyl monomer which can be added optionally is acrylonitrile or methyl methacrylate.

The amount of the rubber-like polymer in the rubber modified styrene resin is 1 to 50 wt %, preferably 2 to 40 wt %. The amount of the graft polymerizable monomer mixture is 99 to 50 wt %, preferably 98 to 60 wt %.

The polyphenylene sulfide resin (PPS) as the component A-2 has a recurring unit represented by the following formula:

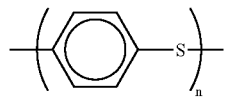

wherein n is an integer of 1 or more; preferably 50 to 500, more preferably 100 to 400.

The polyphenylene sulfide resin may be linear or crosslinked.

To produce the polyphenylene sulfide resin, dichlorobenzene and sodium disulfide are reacted with each other. To produce a crosslinked polyphenylene sulfide resin, a polymer having a low degree of polymerization is polymerized and heated in the presence of air to carry out partial crosslinking so as to increase the molecular weight. To produce a linear polyphenylene sulfide resin, the molecular weight of the resin is increased during polymerization.

The polyether imide resin (PEI) as the component A-2 has a recurring unit represented by the following formula.

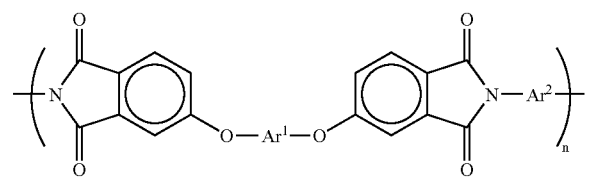

$Ar^1$ in the above formula is the aromatic dihydroxy compound residue and $Ar^2$ is the aromatic diamine residue. Examples of the aromatic dihydroxy compound are aromatic dihydroxy compounds enumerated in the explanation of the polycarbonate resin, out of which bisphenol A is particularly preferred. Examples of the aromatic diamine include m-phenylenediamine, p-phenylenediamine, 4,4'-diaminodiphenyl, 3,4'-diaminodiphenyl, 4,4'-diaminodiphenyl ether, 3,4'-diaminodiphenyl ether, diaminodiphenyl methane, diaminodiphenyl sulfone and diaminodiphenyl sulfide.

In the above formula, n is an integer of 5 to 1,000, preferably 10 to 500.

Processes for producing the polyether imide resin are disclosed by U.S. Pat. No. 3,847,867, U.S. Pat. No. 3,847,869, U.S. Pat. No. 3,850,885, U.S. Pat. No. 3,852,242 and U.S. Pat. No. 3,855,178.

Out of the above components A-2, polyphenylene ether resin (PPE), polycarbonate resin (PC), polyamide resin (PA) and polystyrene-based resin are preferred.

The flame retardant resin compositions of the present invention are roughly divided into two types according to an organic phosphorus compound (component B) used as a flame retardant. One is a flame retardant resin composition (I) which comprises the component B-1 as an organic phosphorus compound and the other is a flame retardant resin composition (II) which comprises the component B-2 as an organic phosphorus compound. The flame retardant resin compositions (I) and (II) of the present invention are outlined hereinbelow.

Flame Retardant Resin Composition (I)

This is a flame retardant resin composition consisting essentially of:
(A) 100 parts by weight of the total of resin components (components A) which include at least 60 wt % of an aromatic polyester resin;
(B) 1 to 100 parts by weight of an organic phosphorus compound (component B-1) represented by the following general formula (1) and having an acid value of 0.7 mgKOH/g or less;
(C) 0 to 50 parts by weight of a flame retardancy improving resin (component C); and
(D) 0 to 200 parts by weight of a filler (component D):

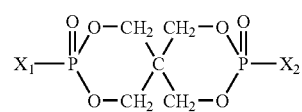

(1)

wherein $X_1$ and $X_2$ are the same or different and each an aromatic substituted alkyl group represented by -(AL)-(Ar)$_n$ (AL is a branched or linear aliphatic hydrocarbon group having 1 to 5 carbon atoms, Ar is a phenyl group, naphthyl group or anthryl group, n is an integer of 1 to 3, and Ar may be bonded to any carbon atom of AL).

Flame Retardant Resin Composition (II)

This is a flame retardant resin composition consisting essentially of (A) 100 parts by weight of the total of resin components (components A) which include at least 60 wt % of an aromatic polyester resin, (B) 5 to 30 parts by weight of an organic phosphorus compound (component B-2) represented by the following general formula (2) and 0.01 to 5 parts by weight of a biscumyl compound (component B-3) represented by the following general formula (3), (C) 0 to 50 parts by weight of a flame retardancy improving resin (component C) and (D) 0 to 200 parts by weight of a filler (component D):

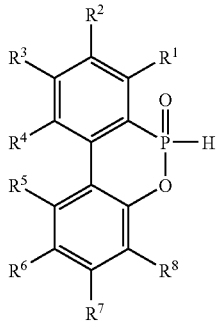

(2)

wherein $R^1$ to $R^8$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y— (Y is —O—, —S— or alkylene group having 1 to 8 carbon atoms, and $Ar^3$ is an aryl group having 6 to 15 carbon atoms),

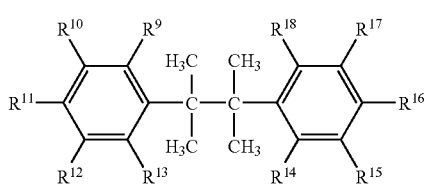

(3)

wherein $R^9$ to $R^{18}$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y— (Y is —O—, —S— or alkylene group having 1 to 8 carbon atoms, and $Ar^3$ is an aryl group having 6 to 15 carbon atoms).

The above flame retardant resin compositions (I) and (II) of the present invention will be described in detail. A description is first given of the composition (I).

In the composition (I), the organic phosphorus compound (component B-1) represented by the following general formula (1) is used as a flame retardant.

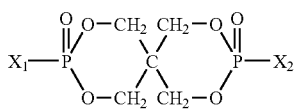

(1)

In the above formula, $X_1$ and $X_2$ are the same or different and each an aromatic substituted alkyl group represented by -(AL)-(Ar)$_n$. AL is a branched or linear aliphatic hydrocarbon group having 1 to 5 carbon atoms, preferably 1 or 2 carbon atoms. Specifically, AL is preferably —CH$_2$—, —CH$_2$—CH$_2$—, —CH(CH$_3$)— or

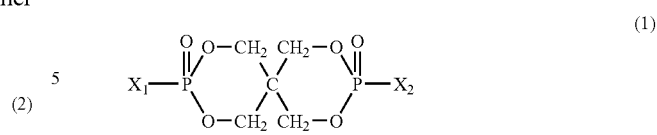

(1)

Ar is a phenyl group, naphthyl group or anthryl group, preferably phenyl group. n is an integer of 1 to 3, preferably 1 or 2. Ar may be bonded to any carbon atom of AL.

The organic phosphorus compound (component B-1) represented by the above formula (1) exhibits an extremely excellent flame retarding effect for an aromatic polyester resin. As far as the inventors of the present invention know, in the halogen-free flame retardation of a conventional aromatic polyester resin, V-0 flame retardancy could not be attained by using a phosphorus compound alone. To attain V-0 flame retardancy by using a phosphorus compound, use of a flame retardant aid or carbonization promoting substance or use of different types of flame retardants was essential. According to the present invention, surprisingly, an aromatic polyester resin can easily attain V-0 flame retardancy by using the above organic phosphorus compound (component B-1) alone. However, in the present invention, besides the component B-1, a flame retardancy improving resin, phosphorus compound other than the component B-1, fluorine-containing resin, filler or other additives may be used to reduce the amount of the component B-1, improve the flame retardancy of a molded article, improve the physical properties of a molded article, or improve the chemical properties of a molded article as a matter of course. These components are described in detail hereinafter.

The organic phosphorus compound (component B-1) as a flame retardant in the flame retardant resin composition (I) of the present invention is represented by the above general formula (1). The most preferred typical compound is at least one selected from compounds represented by the following formulas (1-a) to (1-d). These compounds may be used alone or in combination of two or more.

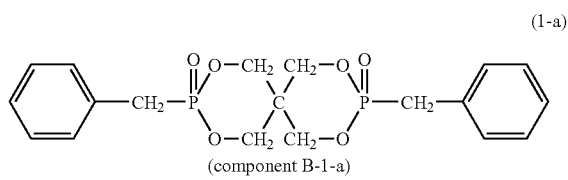

(1-a)

(component B-1-a)

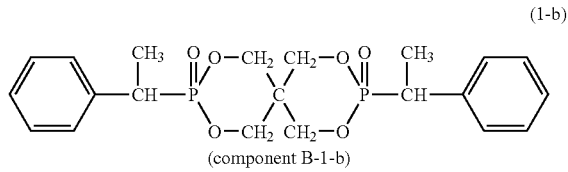

(1-b)

(component B-1-b)

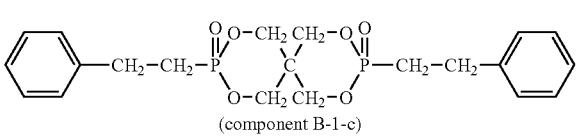

(1-c)

(component B-1-c)

-continued

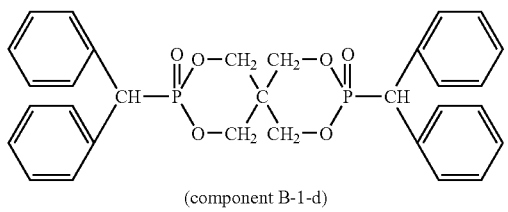

(component B-1-d)

Out of these compounds represented by the above formulas (1-a) to (1-d), the component B-1-a represented by the formula (1-a) or the component B-1-c represented by the formula (1-c) are preferred from the viewpoint of a flame retarding effect or synthesis ease.

A description is subsequently given of the method of synthesizing the above organic phosphorus compound (component B-1) in the present invention. The component B-1 may be produced by a method other than the following methods.

The component B-1 is obtained by reacting pentaerythritol with phosphorus trichloride, treating the oxidized reaction product with an alkali metal compound such as sodium methoxide and reacting the reaction product with an aralkyl halide.

The component B-1 may also be obtained by reacting pentaerythritol with an aralkylphosphonic acid dichloride or by reacting pentaerythritol with phosphorus trichloride to obtain a compound, reacting the compound with an aralkyl alcohol and then carrying out Arbuzov transfer at a high temperature. The latter reactions are disclosed by U.S. Pat. No. 3,141,032, JP-A 54-157156 and JP-A 53-39698.

The method of synthesizing the component B-1 is described hereinbelow. This method is merely described for explanation and the component B-1 used in the present invention may be synthesized not only by this method but also by modifying the method and other methods. The methods are detailed in Preparation Examples 1 to 9.

(i) organic phosphorus compound of the formula (1-a) out of the components B-1;

A reaction product obtained by reacting pentaerythritol with phosphorus trichloride and oxidizing with tertiary butanol is treated with sodium methoxide and further reacted with benzyl bromide.

(ii) organic phosphorus compound of the formula (1-b) out of the components B-1;

A reaction product obtained by reacting pentaerythritol with phosphorus trichloride and oxidizing with tertiary butanol is treated with sodium methoxide and reacted with 1-bromoethylbenzene.

(iii) organic phosphorus compound of the formula (1-c) out of the components B-1;

A reaction product obtained by reacting pentaerythritol with phosphorus trichloride and oxidizing with tertiary butanol is treated with sodium methoxide and reacted with 2-bromoethylbenzene.

(iv) organic phosphorus compound of the formula (1-d) out of the components B-1;

This can be obtained by reacting pentaerythritol with diphenylmethyl phosphonic acid dichloride.

The above components B-1 have an acid value of 0.7 mgKOH/g or less, preferably 0.5 mgKOH/g or less. A molded article which has excellent flame retardancy and color and also a molded article which hardly experiences the decomposition of a polyester resin and has excellent heat stability are obtained by using the component B-1 having an acid value within the above range. A component B-1 having an acid value of 0.4 mgKOH/g or less is the most preferred. The acid value means the amount (mg) of KOH required to neutralize an acid component contained in 1 g of a sample (component B-1).

Further, the component B-1 has an HPLC purity of preferably at least 90%, more preferably at least 95%. The component B-1 having the above purity is preferred because it provides a molded article having excellent flame retardancy and color. The HPLC purity of the component B-1 can be effectively measured by the following method.

The Develosil ODS-7 column having a length of 300 mm and a diameter of 4 mm of Nomura Kagaku Co., Ltd. was used and the column temperature was 40° C. The solvent was a mixed solution of acetonitrile and water in a volume ratio of 6:4 and injected in an amount of 5 μl. A UV-260 nm detector was used.

The method of removing impurities contained in the component B-1 is not particularly limited but a method in which repulp cleaning (cleaning with a solvent and filtration are repeated several times) is carried out with a solvent such as water or methanol is the most effective and economically advantageous.

The above component B-1 is contained in an amount of 1 to 100 parts by weight, preferably 5 to 90 parts by weight, more preferably 10 to 70 parts by weight based on 100 parts by weight of the total of the resin components (components A). The amount of the component B-1 is particularly preferably 15 to 50 parts by weight. A preferred range of the amount of the component B-1 is determined by desired flame retardancy rating, the types of the resin components (components A), the type and amount of the filler, and the like. Further, the amount of the component B-1 can be changed by using a flame retardancy improving resin, other flame retardant or fluorine-containing resin. In most cases, the amount of the component B-1 can be reduced by using the above components.

A description is subsequently given of the flame retardancy improving resin (component C) which may be contained in the flame retardant resin composition (I) of the present invention. The flame retardancy can be improved by blending the component C. The flame retardancy improving resin is preferably a phenolic resin (component C-i), epoxy resin (component C-ii) or styrene-based resin (component C-iii). The components C-i, C-ii and C-iii are described in detail hereinbelow.

Any phenolic resin may be used as the component C-i if it is macromolecular with a plurality of phenolic hydroxyl groups. Examples of the phenolic resin include novolak, resol and heat reactive resins, and modified resins thereof. They may be uncured resins without a curing agent, semi-cured resins or cured resins. Out of these, non-reactive phenol novolak resins without a curing agent are particularly preferred in terms of flame retardancy, impact resistance and economical efficiency. The shape of the phenolic resin is not particularly limited and may be powdered, particulate, flaky, powdery, needle-like or liquid. The above phenolic resins may be used alone or in combination of two or more as required.

The phenolic resin is not particularly limited and may be a commercially available general phenolic resin. For example, to obtain a novolak phenolic resin, a phenol and an aldehyde are charged into a reactor in a molar ratio of 1:0.7 to 1:0.9, a catalyst such as oxalic acid, hydrochloric acid, sulfuric acid or toluenesulfonic acid is added, and then heating and a ref lux reaction are carried out. Vacuum dehydration or standing dehydration is carried out to remove the formed water, and further the residual water and unreacted phenol are removed to obtain the phenolic resin. A condensation phenolic resin can be obtained from a plurality of raw material components and can be used as well.

To obtain a resol phenolic resin, a phenol and an aldehyde are charged into a reactor in a molar ratio of 1:1 to 1:2, a catalyst such as sodium hydroxide, ammonia water or other basic substance is added, and the same operation as the novolak phenolic resin is carried out.

Examples of the phenol include phenol, o-cresol, m-cresol, p-cresol, thymol, p-tert-butylphenol, tert-butylcatechol, catechol, isoeugenol, o-methoxyphenol, 4,4'-dihydroxyphenylpropane, isoamyl salicylate, benzyl salicylate, methyl salicylate and 2,6-di-tert-butyl-p-cresol. These phenols may be used alone or in combination of two or more as required. Examples of the aldehyde include formaldehyde, paraformaldehyde, polyoxymethylene and trioxan. These aldehydes may be used alone or in combination of two or more as well.

The molecular weight of the phenolic resin is not particularly limited but a phenolic resin having a number average molecular weight of preferably 200 to 2,000, more preferably 400 to 1,500 is excellent in mechanical properties, moldability and economic efficiency.

Examples of the epoxy resin used as the component C-ii include bisphenol A epoxy resin, bisphenol F epoxy resin, bisphenol AD epoxy resin, bisphenol S epoxy resin, phenol novolak epoxy resin, cresol novolak epoxy resin, naphthalene epoxy resin and bisphenol epoxy resin. The epoxy resin is not limited to these. These epoxy resins may be used alone or in combination of two or more, or modified.

The styrene-based resin used as the component C-iii which is a flame retardancy improving resin is a homopolymer or copolymer of an aromatic vinyl monomer such as styrene, α-methylstyrene or vinyltoluene, or a copolymer of one of the above monomers and a vinyl monomer. The styrene-based resin as the component C-iii contains the above aromatic vinyl monomer component in an amount of 50 wt % or more, preferably 60 wt % or more, particularly preferably 70 wt % or more.

Specific examples of the styrene-based resin as the component C-iii include polystyrene, high-impact polystyrene (HIPS), acrylonitrile•styrene copolymer (AS resin), acrylonitrile•butadiene•styrene copolymer (ABS resin), methyl methacrylate•butadiene•styrene copolymer (MBS resin), methyl methacrylate•acrylonitrile•butadiene•styrene copolymer (MABS resin), acrylonitrile•acrylic•rubbers•styrene copolymer (AAS resin), acrylonitrile•ethylene propylene-based rubber•styrene copolymer (AES resin) and mixtures thereof.

When the above flame retardancy improving resin (component C) is used, the amount of the component C is 0.01 to 45 parts by weight, preferably 0.1 to 40 parts by weight, particularly preferably 0.5 to 35 parts by weight based on 100 parts by weight of the total of the components A. When the component C is the component C-iii, the amount thereof is 0.01 to 10 parts by weight, preferably 0.1 to 5 parts by weight based on 100 parts by weight of the total of the components A. Even when the amount of the component C-iii is so small, flame retardancy is greatly improved.

The flame retardant resin composition (I) of the present invention may comprise a filler (component D). The filler may be used to improve the physical properties, particularly mechanical properties of a molded article and may be inorganic or organic. It is preferably a fibrous filler.

Examples of the filler (component D) include glass-based fillers such as glass chopped fiber, glass milled fiber, glass roving strand, glass flake, glass bead and glass powder; carbon-based fillers such as carbon fiber, carbon milled fiber, carbon roving strand and carbon flake; inorganic fillers such as talc, mica, wollastonite, kaolin, montmorillonite, bentonite, sepiolite, xonotlite, clay and silica; organic fillers such as aramide fiber; inorganic pigments such as titanium oxide, and carbon black. They may be used alone or in combination of two or more. To reinforce the resin composition, a fibrous filler such as a glass fiber, carbon fiber or mixture thereof is preferably used.

The inorganic filler may be optionally treated with a binder or surface treating agent before use. The type of the binder agent or surface treating agent is not particularly limited but a functional compound such as an epoxy-based compound, silane-based compound or titanate-based compound is suitably selected according to the resin. An epoxy-based compound is preferred, and bisphenol A and/or novolak epoxy resin(s) are/is more preferred.

When the above filler (component D) is used, the amount thereof is 1 to 200 parts by weight, preferably 1 to 150 parts by weight, more preferably 1 to 100 parts by weight based on 100 parts by weight of the total of the above resin components (components A). When the amount is larger than 200 parts by weight, the flame retardancy and physical properties of the resin composition deteriorate and the operation ease and moldability of the resin composition lower disadvantageously.

The flame retardant resin composition (I) of the present invention may comprise a fluorine-containing resin (component E). The flame retardancy of a molded article is improved by blending the component E. Particularly, dripping in the burning test of a molded article is suppressed.

The fluorine-containing resin used as the component E is not particularly limited if it has fibril forming capability. The fluorine-containing resin is a homopolymer or copolymer of a fluorine-containing monomer such as tetrafluoroethylene, trifluoroethylene, vinyl fluoride, vinylidene fluoride or hexafluoropropylene. It is particularly preferably polytetrafluoroethylene having fibril forming capability. The polytetrafluoroethylene having fibril forming capability is, for example, a powder obtained by coagulating and drying a latex obtained by emulsion polymerizing tetrafluoroethylene (so-called fine powder of polytetrafluoroethylene and classified ASTM type 3). Or it is an aqueous dispersion produced by adding a surfactant to the latex and concentrating and stabilizing it (so-called dispersion of polytetrafluoroethylene).

The molecular weight of the polytetrafluoroethylene having fibril forming capability is 1,000,000 to 10,000,000, more preferably 2,000,000 to 9,000,000 in terms of number average molecular weight obtained from standard specific gravity.

The polytetrafluoroethylene having fibril forming capability has a primary particle diameter of preferably 0.05 to 1.0 μm, more preferably 0.1 to 0.5 μm. When a fine powder is used, its secondary particle diameter is 1 to 1,000 μm, preferably 10 to 500 μm.

The polytetrafluoroethylene has flaming drip preventing capability when its specimen is burnt in a UL vertical burning test. Specific examples of the polytetrafluoroethylene having fibril forming capability include Teflon 6J and Teflon 30J of Mitsui•Du Pont Fluorochemical Co., Ltd., Polyfuron MPA FA-500, Polyfuron F-201L and Polyfuron D-1 of Daikin Kagaku Kogyo Co., Ltd., and CD076 of Asahi ICI Fluoropolymers Co., Ltd.

A fine powder of polytetrafluoroethylene which has been subjected to a treatment for the prevention of secondary agglomeration is more preferred. The treatment is the baking of the surface of polytetrafluoroethylene. Or it is the coating of the surface of polytetrafluoroethylene having fibril forming capability with polytetrafluoroethylene having no fibril forming capability.

Polytetrafluoroethylene subjected to the latter treatment is more preferred in the present invention. In the former case, the targeted fibril forming capability is apt to deteriorate. In this case, the amount of polytetrafluoroethylene having no fibril forming capability is preferably 70 to 95 wt %. The number average molecular weight obtained from standard specific gravity of polytetrafluoroethylene having fibril forming capability is 10,000 to 1,000,000, preferably 10,000 to 800,000.

The polytetrafluoroethylene (may be abbreviated as PTFE hereinafter) may be used in the form of an aqueous dispersion besides a solid form as described above.

Although the polytetrafluoroethylene may be used in the form of an aqueous emulsion or dispersion besides a normal solid form, the polytetrafluoroethylene in a solid form is particularly preferably used because a dispersant is apt to exert a bad influence upon moist heat resistance.

An agglomerated mixture of an emulsion of the polytetrafluoroethylene having fibril forming capability and an emulsion of a vinyl-based polymer is also preferably used to improve dispersibility in a resin and obtain a better appearance and higher mechanical properties.

Examples of the vinyl-based polymer include polypropylene, polyethylene, polystyrene, HIPS, AS resin, ABS resin, MBS resin, MABS resin, AAS resin, polymethyl (meth) acrylate, block copolymers of styrene and butadiene, hydrogenatedcopolymers thereof, block copolymers of styrene and isoprene, hydrogenated copolymers thereof, acrylonitrile-butadiene copolymer, ethylene-propylene random copolymer and block copolymer, ethylene-butene random copolymer and block copolymer, ethylene-α-olefin copolymers, ethylene-unsaturated carboxylate copolymers such as ethylene-butyl acrylate copolymer, acrylate-butadiene copolymers such as butyl acrylate-butadiene copolymer, rubber-like polymers such as polyalkyl (meth)acrylate, composite rubbers containing polyorganosiloxane and polyalkyl (meth)acrylate, and copolymers obtained by graft polymerizing one of the composite rubbers with a vinyl-based monomer such as styrene, acrylonitrile or polyalkyl methacrylate.

To prepare the agglomerated mixture, an aqueous emulsion of the above vinyl-based polymer having an average particle diameter of 0.01 to 1 μm, particularly 0.05 to 0.5 μm is mixed with an aqueous emulsion of polytetrafluoroethylene having an average particle diameter of 0.05 to 10 μm, particularly 0.05 to 1.0 μm. The emulsion of polytetrafluoroethylene is obtained by emulsion polymerizing polytetrafluoroethylene in the presence of a fluorine-containing surfactant. A comonomer such as hexafluoropropylene may be copolymerized in an amount of 10 wt % or less based on polytetrafluoroethylene for the above emulsion polymerization.

To obtain the agglomerated mixture, a suitable polytetrafluoroethylene emulsion having a solid content of generally 40 to 70 wt %, particularly 50 to 65 wt % and a suitable vinyl-based polymer emulsion having a solid content of 25 to 60 wt %, particularly 30 to 45 wt % are used. Further, the amount of polytetrafluoroethylene in the agglomerated mixture is preferably 1 to 80 wt %, particularly preferably 1 to 60 wt % based on 100 wt % of the total of the polytetrafluoroethylene and the vinyl-based polymer used in the agglomerated mixture. After the above emulsions are mixed together, they are stirred and injected into hot water containing a metal salt such as calcium chloride or magnesium sulfate to separate and collect the above agglomerated mixture through salting-out and solidification. Alternatively, the stirred and mixed emulsions may be spray dried or freeze dried to collect the agglomerated mixture.

The agglomerated mixture of the emulsion of polytetrafluoroethylene having fibril forming capability and the emulsion of the vinyl-based polymer may be various in form. For example, each polytetrafluoroethylene particle is coated with the vinyl-based polymer, the vinyl-based polymer is coated with polytetrafluoroethylene, or several particles agglomerate around one particle.

Further, the same or different type of a vinyl-based polymer may be graft polymerized on the outer layer of the agglomerated mixture. Preferred examples of the vinyl-based monomer include styrene, α-methylstyrene, methyl methacrylate, cyclohexyl acrylate, dodecyl methacrylate, dodecyl acrylate, acrylonitrile and 2-ethylhexyl acrylate. They may be used alone or copolymerized.

Typical commercially available products of the agglomerated mixture of the emulsion of polytetrafluoroethylene having fibril forming capability and the emulsion of the vinyl-based polymer include the Metabrene A3000 of Mitsubishi Rayon Co., Ltd. and the BLENDEX449 of GE Specialty Chemicals Co., Ltd.

When the component E is used, the amount thereof is preferably 0.01 to 10 parts by weight, more preferably 0.1 to 5 parts by weight based on 100 parts by weight of the total of the components A. Below 0.01 part by weight, sufficient flaming drip prevention capability is easily obtained and above 10 parts by weight, a poor appearance may be hardly obtained or a dispersion failure may rarely occur, and it is economically advantageous.

Some embodiments of the flame retardant resin composition (I) of the present invention are described hereinbelow.

One of the embodiments is a flame retardant resin composition (I) which consists essentially of the following components (A) to (E). The composition of this embodiment contains a fluorine-containing resin as component E and has an excellent drip preventing effect in the burning test of a molded article.

(A) 100 parts by weight of the total of resin components (components A) which include at least 60 wt % of an aromatic polyester resin, (B) 1 to 100 parts by weight of an organic phosphorus compound (component B-1) represented by the above general formula (1) and having an acid value of 0.7 mgKOH/g or less, (C) 0 to 50 parts by weight of a flame retardancy improving resin (component C), (D) 0 to 200 parts by weight of a filler (component D) and (E) 0.01 to 10 parts by weight of a fluorine-containing resin (component E).

Another embodiment is a flame retardant resin composition which consists essentially of the following components (A) to (E) and has a heat stability (MVR change rate) of 20% or less, preferably 15% or less, more preferably 10% or less, particularly preferably 5% or less. The composition of this embodiment provides excellent heat stability (especially heat stability of mechanical strength) to a molded article due to the high purity (especially acid value or HPLC purity) of the component B-1. The heat stability is measured by a method which is described hereinafter.

(A) 100 parts by weight of the total of resin components (components A) which include at least 60 wt % of an aromatic polyester resin, (B) 1 to 100 parts by weight of an organic phosphorus compound (component B-1) represented by the above general formula (1), (C) 0 to 50 parts by weight of a flame retardancy improving resin (component C),
(D) 0 to 200 parts by weight of a filler (component D), and
(E) 0 to 10 parts by weight of a fluorine-containing resin (component E).

Still another embodiment is a flame retardant resin composition which consists essentially of the following components (A), (B), (C) and (E) and has transparency with a total light transmittance of 80% or more, preferably 83% or more, more preferably 85% or more. The composition of this embodiment provides a molded article containing substantially no filler and having high transparency. Since the organic phosphorus compound as the component B-1 is an achromatic powder and has excellent compatibility with the resin components A, a molded article of this composition has excellent transparency and when a pigment or dye is added, a transparent molded article having a bright color is obtained.

(A) 100 parts by weight of the total of resin components (components A) which include at least 60 wt % of an aromatic polyester resin,
(B) 1 to 100 parts by weight of an organic phosphorus compound (component B-1) represented by the above general formula (1) and having an acid value of 0.7 mgKOH/g or less,
(C) 0 to 50 parts by weight of a flame retardancy improving resin (component C), and
(E) 0 to 10 parts by weight of a fluorine-containing resin (component E).

The above flame retardant resin composition (I) of the present invention contains substantially no halogen and attains V-2 flame retardancy as a matter of course, V-0 flame retardancy in most embodiments. A 1.6 mm-thick molded article of the composition (I) of the present invention can attain UL-94 V-0 flame retardancy. Even a 0.8 mm-thick molded article of the composition (I) can attain V-0 flame retardancy under favorable conditions.

A description is subsequently given of the flame retardant resin composition (II) of the present invention. The flame retardant resin composition (II) consists essentially of the following components (A) to (D).

That is, the flame retardant resin composition consists essentially of (A) 100 parts by weight of the total of resin components (components A) which include at least 60 wt % of an aromatic polyester resin, (B) 5 to 30 parts by weight of an organic phosphorus compound (component B-2) represented by the following general formula (2) and 0.01 to 5 parts by weight of a biscumyl compound (component B-3) represented by the following general formula (3), (C) 0 to 50 parts by weight of a flame retardancy improving resin (component C) and (D) 0 to 200 parts by weight of a filler (component D):

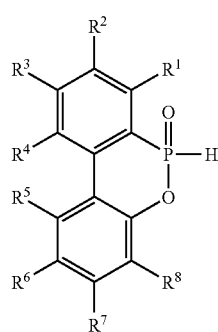

(2)

wherein $R^1$ to $R^8$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y— (Y is —O—, —S— or alkylene group having 1 to 8 carbon atoms, and $Ar^3$ is an aryl group having 6 to 15 carbon atoms),

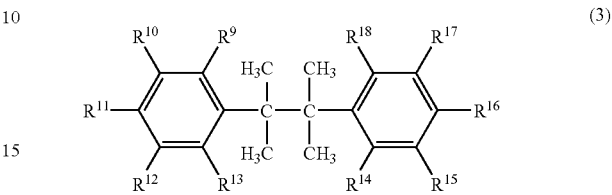

(3)

wherein $R^9$ to $R^{18}$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y— (Y is —O—, —S— or alkylene group having 1 to 8 carbon atoms, and $Ar^3$ is an aryl group having 6 to 15 carbon atoms).

The above flame retardant resin composition (II) is characterized in that it comprises both of the components B-2 and B-3 as flame retardants. In this composition (II), the resin components (components A), flame retardancy improving resin (component C), filler (component D) and fluorine-containing resin (component E) are identical to those described in the above flame retardant resin composition (I), and preferred components are also identical. The composition (I) and the component (II) are common in the amount of each component and the preferred range of the amount of each component. Therefore, detailed descriptions of the components A, C, D and E of the composition (II) are omitted. The components B-2 and B-3 are described hereinbelow.

The flame retardants in the flame retardant resin composition (II) are the organic phosphorus compound (component B-2) represented by the above general formula (2) and the biscumyl compound (component B-3) represented by the above general formula (3).

The organic phosphorus compound (component B-2) of the above general formula (2) is a 6H-benzo[c,e][1,2]oxaphospholin-6-one derivative. The two benzene rings of this compound may each have 1 to 4 substituents, preferably 1 to 2 substituents. The substituents ($R^1$ to $R^8$) are selected from (i) alkyl groups having 1 to 12 carbon atoms, preferably alkyl groups having 1 to 9 carbon atoms such as methyl group, ethyl group, propyl group, isopropyl group, n-butyl group, sec-butyl group, tert-butyl group, neopentyl group and nonyl group, (ii) alkyloxy groups having. 1 to 12 carbon atoms, preferably alkyloxy groups having 1 to 9 carbon atoms such as methoxy group, ethoxy group, propoxy group, butoxy group and pentoxy group, (iii) alkylthio groups having 1 to 12 carbon atoms, preferably alkylthio groups having 1 to 9 carbon atoms such as methylthio group, ethylthio group, propylthio group, butylthio group and pentylthio group, and (iv) groups represented by $Ar^3$—Y— (Y is —O—, —S— or alkylene group having 1 to 8 carbon atoms, preferably 1 to 4 carbon atoms, and $Ar^3$ is an aryl group having 6 to 15 carbon atoms, preferably 6 to 10 carbon atoms). The component B-2 is particularly preferably an organic phosphorus compound in which $R^1$ to $R^8$ are all hydrogen atoms because it is easily acquired.

The organic phosphorus compound as the component B-2 can be generally obtained by thermally condensing phosphorus trichloride with an o-phenylphenol compound in the presence of a Friedel-Crafts catalyst and carrying out hydrolysis. This reaction is disclosed by JP-A 47-16436, JP-A 7-145185 and JP-A 10-1490, and this method is preferably employed.

The two benzene rings of the biscumyl compound (component B-3) of the above general formula (3) may have 1 to 5 substituents, preferably 1 to 3 substituents, respectively. The substituents are selected from (i) alkyl groups having 1 to 12 carbon atoms, (ii) alkyloxy groups having 1 to 12 carbon atoms, (iii) alkylthio groups having 1 to 12 carbon atoms and (iv) groups represented by $Ar^3$—Y— like substituents in the above general formula (2). The component B-3 is economically particularly preferably a (biscumyl) compound in which $R^9$ to $R^{18}$ are all hydrogen atoms because it is easily acquired.

In the composition (II), the amount of the component B-2 is 5 to 30 parts by weight, preferably 6 to 25 parts by weight, more preferably 7 to 20 parts by weight based on 100 parts by weight of the total of the resin components (components A). Below 5 parts by weight, the obtained resin composition is inferior in flame retardancy and above 30 parts by weight, the resin composition deteriorates in physical properties and it is economically disadvantageous.

The amount of the component B-3 is 0.01 to 5 parts by weight, preferably 0.02 to 4 parts by weight, more preferably 0.03 to 3 parts by weight based on 100 parts by weight of the total of the resin components (components A). Below 0.01 part by weight, the obtained resin composition is inferior in flame retardancy and above 5 parts by weight, the resin composition deteriorates in physical properties and flame retardancy and it is economically disadvantageous.

It is advantageous that the total amount of the components B-2 and B-3 in the composition (II) be 6 to 33 parts by weight, preferably 7 to 30 parts by weight based on 100 parts by weight of the total of the components A and that the weight ratio of the component B-2 to the component B-3 be 4/1 to 70/1, preferably 5/1 to 60/1.

The composition (II) contains substantially no halogen and can attain UL-94 V-0 flame retardancy for a 1.6 mm-thick molded article, or 0.8 mm-thick molded article under favorable conditions.

The components A, B (B-1, B-2 and B-3), C, D and E constituting the flame retardant resin compositions (I) and (II) of the present invention have already been described. Components other than the above components may be used optionally in limits that do not impair the object of the present invention. The other components which can be added to the compositions (I) and (II) are described hereinbelow.

(1) phosphorus or phosphorus compound (component F);

Phosphorus or a phosphorus compound (component F) known per se may be used as a flame retardant in the compositions (I) and (II) besides the organic phosphorus compound (component B). When the component F is used in conjunction with the component B, a flame retarding effect, physical strength and heat resistance can be improved and cost can be further reduced.

Examples (F-1) to (F-4) of the component F are given below.

(F-1); red phosphorus (F-2); a triaryl phosphate represented by the following general formula (F-2)

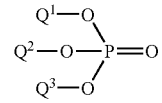

(F-3); a condensation phosphate represented by the following general formula (F-3)

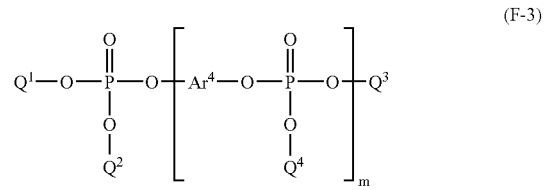

(F-4); a condensation phosphate represented by the following general formula (F-4)

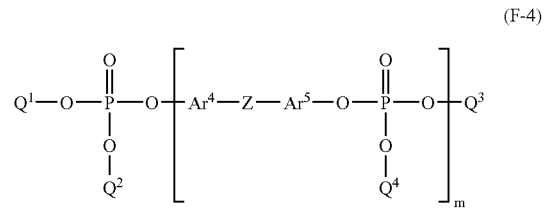

$Q^1$ to $Q^4$ in the above formulas (F-2) to (F-4) may be the same or different and each an aryl group having 6 to 15 carbon atoms, preferably aryl group having 6 to 10 carbon atoms. Examples of the aryl group include phenyl group, naphthyl group and anthryl group. The aryl group may have 1 to 5 substituents, preferably 1 to 3 substituents. The substituents are selected from (i) alkyl groups having 1 to 12 carbon atoms, preferably alkyl groups having 1 to 9 carbon atoms such as methyl group, ethyl group, propyl group, isopropyl group, n-butyl group, sec-butyl group, tert-butyl group, neopentyl group and nonyl group, (ii) alkyloxy groups having 1 to 12 carbon atoms, preferably alkyloxy groups having 1 to 9 carbon atoms such as methoxy group, ethoxy group, propoxy group, butoxy group and penthoxy group, (iii) alkylthio groups having 1 to 12 carbon atoms, preferably alkylthio groups having 1 to 9 carbon atoms such as methylthio group, ethylthio group, propylthio group, butylthio group and pentylthio group, and (iv) groups represented by $Ar^6$—$W^1$— ($W^1$ is —O—, —S— or alkylene group having 1 to 8 carbon atoms, preferably 1 to 4 carbon atoms, and $Ar^6$ is an aryl group having 6 to 15 carbon atoms, preferably 6 to 10 carbon atoms).

In the formulas (F-3) and (F-4), $Ar^4$ and $Ar^5$ may be the same or different and each an arylene group having 6 to 15 carbon atoms, preferably arylene group having 6 to 10 carbon atoms when both of them are existent (in the case of F-4). Examples of $Ar^4$ and $Ar^5$ include phenylene group and naphthylene group. The arylene group may have 1 to 4 substituents, preferably 1 to 2 substituents. The substituents are selected from (i) alkyl groups having 1 to 4 carbon atoms such as methyl group, ethyl group, propyl group, isopropyl group, n-butyl group, sec-butyl group and tert-butyl group, (ii) aralkyl groups having 7 to 20 carbon atoms such as benzyl group, phenethyl group, phenylpropyl group, naphthylmethyl group-and cumyl group, (iii) groups represented by $Q^5$—$W^2$— ($W^2$ is —O— or —S—, and $Q^5$ is an alkyl group having 1 to 4 carbon atoms, preferably 1 to 3 carbon atoms or aryl group having 6 to 15 carbon atoms, preferably 6 to 10 carbon atoms), and (iv) aryl groups having 6 to 15 carbon atoms such as phenyl group.

In the formulas (F-3) and (F-4), m is an integer of 1 to 5, preferably 1 to 3, particularly preferably 1.

In the formula (F-4), Z is a single bond or group for linking $Ar^4$ and $Ar^5$, and —$Ar^4$—Z—$Ar^5$— is the residue derived from bisphenol. Accordingly, Z is a single bond, —O—, —CO—, —S—, —$SO_2$— or alkylene group having 1 to 3 carbon atoms, preferably single bond, —O— or isopropylidene.

A phosphorus compound other than phosphorus and phosphorus compounds of the above formulas (F-1) to (F-4) may be use d in combination with the component B. For example, the component B-2 may be used in the composition (I) and the component B-1 may be used in the composition (II).

When phosphorus or a phosphorus compound (component F) of one of the above formulas (F-1) to (F-4) is blended with the resin composition, the amount thereof is preferably 1 to 100 parts by weight, more preferably 5 to 80 parts by weight, particularly preferably 10 to 60 parts by weight based on 100 parts by weight of the organic phosphorus compound (component B). Out of the phosphorus and phosphorus compounds of the formulas (F-1) to (F-4), phosphorus compounds of the formulas (F-2) to (F-4) are preferred.

(2) flame retardant aid;

A known flame retardant aid may be further blended with the flame retardant resin compositions (I) and (II) of the present invention. The flame retardant aid is, for example, a silicone oil. The silicone oil is a polydiorganosiloxane, preferably polydiphenylsiloxane, polymethylphenylsiloxane, polydimethylsiloxane, or a copolymer or mixture thereof. Out of these, polydimethylsiloxane is preferred. The viscosity of the silicone oil is preferably 0.8 to 5,000 cp (25° C.), more preferably 10 to 1,000 cp (25° C.), particularly preferably 50 to 500 cp (25° C.). A flame retardant aid having a viscosity within the above range has excellent flame retardancy. The amount of the silicone oil is preferably 0.5 to 10 parts by weight based on 100 parts by weight of the total of the resin components (components A).

(3) compatibilizing agent;

A compatibilizing agent may be optionally added to the flame retardant resin compositions (I) and (II) of the present invention. The compatibilizing agent is not limited to a particular kind and preferably can compatibilize polymers as well as resin components such as the components A and/or the component C with other additives when a mixture of the components A-1 and A-2 is used or the component A and the component C are used as a mixture of two or more components. Not only the mechanical properties but also the flame retardancy of the flame retardant resin compositions (I) and (II) of the present invention can be improved by adding the compatibilizing agent. The amount of the compatibilizing agent is not particularly limited but may be such that it does not impair the object of the present invention.

(4) additives;

Additives such as deterioration preventing agents including antioxidant, ultraviolet light absorber and optical stabilizer, lubricant, antistatic agent, release agent, plasticizer and colorant (pigment) may be added to the flame retardant resin compositions (I) and (II) of the present invention. The amounts of the above additives can be suitably selected according to the types and purposes of the additives in limits that do not impair flame retardancy, heat resistance, impact resistance and mechanical strength.

As for the preparation of the flame retardant resin compositions (I) and (II) of the present invention, preferably, the resin components (components A), organic phosphorus compound (component B) and optionally other components are pre-mixed together by a mixer such as twin-cylinder mixer, super mixer, super floater or Henschel mixer, and the obtained pre-mixture is supplied to a kneader to be melt kneaded. The kneader is a melt mixer such as kneader, or a single-screw or double-screw extruder. Out of these, a double-screw extruder is used to melt a resin composition at 220 to 280° C., preferably 230 to 270° C., liquid components are injected by a side feeder, and the obtained product is extruded and pelletized by a pelletizer.

The flame retardant resin compositions (I) and (II) of the present invention contain substantially no halogen, have extremely high flame retardancy and are useful as molding materials for producing various molded articles such as home electric appliance parts, electric and electronic parts, auto parts, mechanical and structural parts, and cosmetic containers. Stated more specifically, they can be advantageously used in breaker parts, switch parts, motor parts, ignition coil cases, power plugs, power outlets, coil bobbins, connectors, relay cases, fuse cases, flyback transformer parts, focus block parts, distributor caps and harness connectors. They are also useful in housings, casings and chassis, which are being reduced in thickness, such as housings or casings and chassis for electronic and electric products (for example, home electric appliances and OA equipment such as telephones, personal computers, printers, facsimiles, copiers, video decks and audio equipment, and their parts). They are particularly useful for housings for printers, fixing unit parts, and mechanical and constituent parts of home electric appliances and OA equipment such as facsimiles which require high heat resistance and flame retardancy.

The molding technique is not particularly limited and may be injection molding, blow molding or press molding. Preferably, a molded article is preferably produced by injection molding a pellet-like resin composition with an injection molding machine.

The organic phosphorus compound of the formula (1-d) out of the components B-1 used in the flame retardant resin composition (I) of the present invention is a novel compound as far as the inventors of the present invention know and was provided by the inventors of the present invention and used as a flame retardant for the first time.

According to the present invention, there are provided a flame retardant which is an organic phosphorus compound represented by the following formula (1-d) and a flame retardant resin composition which comprises the organic phosphorus compound in an effective amount as a flame retardant. The organic phosphorus compound of the formula (1-d) can be used as a flame retardant for a polyester resin but is expected to have the same effect as a flame retardant for other resins.

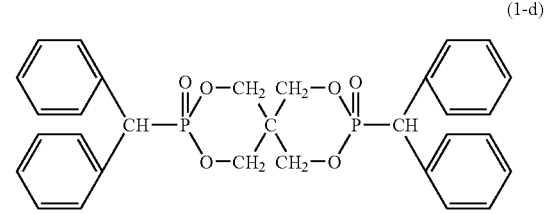

(1-d)

EXAMPLES

The following examples are provided for the purpose of further illustrating the present invention but are in no way to be taken as limiting. Evaluations were made by the following methods.

(1) Flame Retardancy (UL-94 Ratings)

Flame retardancy was evaluated using 1/16-inch (1.6 mm) and 1/32-inch (0.8 mm) thick test pieces in accordance with a vertical burning test specified in UL-94 of the US UL standards as an index for evaluating flame retardancy. The flame retardancy of each test piece is classified V-0 when combustion ceases within 10 seconds after the removal of flames and flaming drips do not ignite cotton, V-2 when combustion ceases within 30 seconds and flaming drips ignite cotton, and not V when flame retardancy is below the above criteria.

(2) Flame Retardancy (OI Test)

This was evaluated in accordance with JIS-K-7201. As the numerical value increases, the flame retardancy becomes higher.

(3) Acid Value

This was measured in accordance with JIS-K-3504.

(4) MVR (Fluidity Test)

This was measured in accordance with ISO-1133.

(5) Heat Stability (MVR Change Rate)

The pellet was treated at 130° C. for 24 hours. MVR of the pellet was measured under a load of 3.8 kg at 230° C. before and after the treatment to obtain its change rate from the following expression.

$$\Delta Y = (|Y_2 - Y_1|/Y_1) \times 100(\%)$$

$Y_1$: MVR before treatment (cm$^3$/10 min)
$Y_2$: MVR after treatment (cm$^3$/10 min)

Preparation examples of the organic phosphorus compound used in Examples are given below.

Preparation Example 1

Preparation of 2,4,8,10-tetraoxa-3,9-diphosphaspiro[5,5]undecane,3,9-dibenzyl-3,9-dioxide (FR-1)

6.81 parts of pentaerythritol, 0.16 part of pyridine and 8.65 parts of toluene were charged into a reactor equipped with a thermometer, capacitor and dropping funnel to be stirred. 13.76 parts of phosphorus trichloride was added to the reactor using the dropping funnel and stirred under heating at 60° C. After a reaction, the reactor was cooled to room temperature, 26.50 parts of methylene chloride was added to the obtained reaction product, and 7.42 parts of tertiary butanol and 1.25 parts of methylene chloride were added dropwise under cooling with ice. The obtained crystals were cleaned with toluene and methylene chloride and then filtered. The obtained filtrate was dried at 80° C. and $1.33 \times 10^2$ Pa for 12 hours to produce 10.76 parts of a white solid. It was confirmed from the $^{31}$P, $^1$HNMR spectrum that the obtained solid was 2,4,8,10-tetraoxa-3,9-diphosphaspiro[5,5]undecane,3,9-dihydro-3,9-dioxide.

7.31 parts of 2,4,8,10-tetraoxa-3,9-diphosphaspiro[5,5]undecane,3,9-dihydro-3,9-dioxide and 47.22 parts of DMF were charged into a reactor equipped with a thermometer, capacitor and dropping funnel to be stirred. 3.53 parts of sodium methoxide was added to the reactor under cooling with ice. They were stirred under cooling with ice for 2 hours and further stirred at room temperature for 5 hours. After DMF was distilled off, 18.89 parts of DMF was added and 10.94 parts of benzyl bromide was added dropwise to the reaction mixture under cooling with ice. After 3 hours of agitation under cooling with ice, DMF was distilled off, and the residue was cleaned with water and methanol and then filtered. The obtained filtrate was dried at 120° C. and $1.33 \times 10^2$ Pa for 19 hours to produce 10.15 parts of a white solid. It was confirmed from the $^{31}$P, $^1$HNMR spectrum and elemental analysis that the obtained solid was 2,4,8,10-tetraoxa-3,9-diphosphaspiro[5,5]undecane,3,9-dibenzyl-3,9-dioxide. This compound had a yield of 78% and a $^{31}$PNMR purity of 99%. It had an HPLC purity measured by the method of this text of 99%. It had an acid value of 0.06 mgKOH/g.

$^1$H-NMR (DMSO-d$_6$, 300 MHz): δ7.2–7.4 (m, 10H), 4.1–4.5 (m, 8H), 3.5 (d, 4H), $^{31}$P-NMR (DMSO-d$_6$, 120 MHZ): δ23.1 (S), melting point: 255–256° C., elemental analysis calculated values: C, 55.89; H, 5.43, measurement values: C, 56.24; H, 5.35.

Preparation Example 2

Preparation of 2,4,8,10-tetraoxa-3,9-diphosphaspiro[5,5]undecane,3,9-dibenzyl-3,9-dioxide (FR-2)

408.3 g (1.0 mol) of 3,9-dibenzyloxy-2,4,8,10-tetraoxa-3,9-diphosphaspiro[5,5]undecane and 342.1 g (2.0 mol) of benzyl bromide were charged into a reactor equipped with a stirrer, thermometer and capacitor, and dry nitrogen was caused to flow into the reactor under agitation at room temperature. Thereafter, heating was started with an oil bath which was kept at 150° C. for 10 minutes. The oil bath was removed to cool the reactor to room temperature. 2,000 ml of methanol was added to the obtained reaction product which was a white solid and stirred to clean the reaction product, and the white powder was separated by filtration with a glass filter. Then, the separated white powder was cleaned with 2,000 ml of a 50 wt % aqueous solution of methanol and dried at 100 Pa and 120° C. for 8 hours to produce 334.6 g of bisbenzyl pentaerythritol diphosphonate. It was confirmed from mass spectral analysis, $^1$H, $^{31}$P nuclear magnetic resonance spectral analysis and elemental analysis that the product was bisbenzyl pentaerythritol diphosphonate. This compound had a yield of 82%, an HPLC purity of 99.2% and an acid value of 0.34 mgKOH/g.

$^1$H-NMR (DMSO-d$_6$, 300 MHz): δ7.2–7.4 (m, 10H), 4.1–4.5 (m, 8H), 3.5 (d, 4H), $^{31}$P-NMR (DMSO-d$_6$, 120 MHz): δ23.1 (S), melting point: 257° C.

Preparation Example 3

Preparation of 2,4,8,10-tetraoxa-3,9-diphosphaspiro[5,5]undecane,3,9-dibenzyl-3,9-dioxide (FR-3)

6.81 parts of pentaerythritol, 0.16 part of pyridine and 8.65 parts of toluene were charged into a reactor equipped with a thermometer, capacitor and dropping funnel to be stirred. 13.76 parts of phosphorus trichloride was added to the reactor using the dropping funnel and stirred under heating at 60° C. 10.82 parts of benzyl alcohol was added to the obtained reaction mixture and stirred under heating. After the end of a reaction, 0.1 part of benzyl bromide was added, and the reactor was sealed up and heated at 200° C. The reaction mixture was cooled with ice, and the formed white solid was separated by filtration and dried under vacuum at 100° C. and $1.33 \times 10$ Pa. It was confirmed from the $^{31}$P, $^1$HNMR spectrum that the obtained white solid was 2,4,8,10-tetraoxa-3,9-diphosphaspiro[5,5]undecane,3,9-dibenzyl-.3,9-dioxide. The acid value of the solid was 2.5 mgKOH/g.

Preparation Example 4

Preparation of 2,4,8,10-tetraoxa-3,9-diphosphaspiro[5,5]undecane,3,9-diα-methylbenzyl-3,9-dioxide (FR-4)

6.81 parts of pentaerythritol, 0.16 part of pyridine and 8.65 parts of toluene were charged into a reactor equipped with a thermometer, capacitor and dropping funnel to be stirred. 13.76 parts of phosphorus trichloride was added to the reactor using the dropping funnel and stirred under heating at 60° C. After a reaction, the reactor was cooled to room temperature, 26.50 parts of methylene chloride was added to the obtained reaction product, and 7.42 parts of tertiary butanol and 1.25 parts of methylene chloride were added dropwise under cooling with ice. The obtained crystals were cleaned with toluene and methylene chloride and filtered. The obtained filtrate was dried at 80° C. and $1.33\times10^2$ Pa for 12 hours to produce 10.76 g of a white solid. It was confirmed from $^{31}$PNMR and $^1$HNMR spectrum that the obtained solid was 2,4,8,10-tetraoxa-3,9-diphosphaspiro[5,5]undecane,3,9-dihydro-3,9-dioxide.

7.31 parts of the obtained 2,4,8,10-tetraoxa-3,9-diphosphaspiro[5,5]undecane,3,9-dihydro-3,9-dioxide and 47.22 parts of DMF were charged into a reactor equipped with a thermometer, capacitor and dropping funnel to be stirred. 3.53 parts of sodium methoxide was added to the reactor under cooling with ice. After 2 hours of agitation under cooling with ice, they were stirred at room temperature for 5 hours. After DMF was distilled off, 18.89 parts of DMF was added, and 11.84 parts of (1-bromoethyl)benzene was added dropwise to the reaction mixture under cooling with ice. After 3 hours of agitation under cooling with ice, DMF was distilled off, and the residue was cleaned with water and methanol and then filtered. The obtained filtrate was dried at 120° C. and $1.33\times10^2$ Pa for 19 hours to produce 8.5 parts of a white solid. It was confirmed from $^{31}$PNMR, $^1$HNMR spectrum and elemental analysis that the obtained solid was 2,4,8,10-tetraoxa-3,9-diphosphaspiro[5,5]undecane,3,9-diα-methylbenzyl-3,9-dioxide. This compound had a $^{31}$PNMR purity of 99%. It had an HPLC purity measured by the method of this text of 99% and an acid value of 0.03 mgKOH/g.

$^1$H-NMR (CDCl$_3$, 300 MHz): δ7.2 to 7.4 (m. 10H), 4.0–4.2 (m, 4H), 3.4–3.8 (m, 4H), 3.3 (qd, 4H), 1.6 (ddd, 6H), $^{31}$P-NMR (CDCl$_3$, 120 MHZ): δ28.7 (S), melting point: 190–210° C., elemental analysis calculated values: C, 57.80; H, 6.01, measurement values: C, 57.83; H, 5.96.

Preparation Example 5

Preparation of 2,4,8,10-tetraoxa-3,9-diphosphaspiro[5,5]undecane,3,9-di(2-phenylethyl)-3,9-dioxide (FR-5)

6.81 parts of pentaerythritol, 0.16 part of pyridine and 8.65 parts of toluene were charged into a reactor equipped with a thermometer, capacitor and dropping funnel to be stirred. 13.76 parts of phosphorus trichloride was added to the reactor using the dropping funnel and stirred under heating at 60° C. After a reaction, the reactor was cooled to room temperature, 26.50 parts of methylene chloride was added to the obtained reaction product, and 7.42 parts of tertiary butanol and 1.25 parts of methylene chloride were added dropwise under cooling with ice. The obtained crystals were cleaned with toluene and methylene chloride and then filtered. The obtained filtrate was dried at 80° C. and $1.33\times10^2$ Pa for 12 hours to produce 10.76 parts of a white solid. It was confirmed from $^{31}$PNMR and $^1$HNMR spectrum that the obtained solid was 2,4,8,10-tetraoxa-3,9-diphosphaspiro[5,5]undecane,3,9-dihydro-3,9-dioxide.

7.31 parts of the obtained 2,4,8,10-tetraoxa-3,9-diphosphaspiro[5,5]undecane,3,9-dihydro-3,9-dioxide and 47.22 parts of DMF were charged into a reactor equipped with a thermometer, capacitor and dropping funnel to be stirred. 3.53 parts of sodium methoxide was added to the reactor under cooling with ice. After 2 hours of agitation under cooling with ice, they were stirred at room temperature for 5 hours. After DMF was distilled off, 18.89 parts of DMF was added, and 11.84 parts of (2-bromoethyl)benzene was added dropwise to the reaction mixture under cooling with ice. After 3 hours of agitation under cooling with ice, DMF was distilled off, and the residue was cleaned with water and methanol and then filtered. The obtained filtrate was dried at 120° C. and $1.33\times10^2$ Pa for 19 hours to produce 11.3 parts of a white solid. It was confirmed from $^{31}$PNMR, $^1$HNMR spectrum and elemental analysis that the obtained solid was 2,4,8,10-tetraoxa-3,9-diphosphaspiro[5,5]undecane,3,9-di(2-phenylethyl)-3,9-dioxide. This compound had a $^{31}$PNMR purity of 99%. It had an HPLC purity measured by the method of this text of 99% and an acid value of 0.03 mgKOH/g.

$^1$H-NMR (CDCl$_3$, 300 MHz): δ7.1–7.4 (m. 10H), 3.85–4.65 (m, 8H), 2.90–3.05 (m, 4H), 2.1–2.3 (m, 4H), $^{31}$P-NMR (CDCl$_3$, 120 MHz): δ31.5 (S), melting point: 245–246° C., elemental analysis calculated values: C, 57.80; H, 6.01, measurement values: C, 58.00; H, 6.07.

Preparation Example 6

Preparation of 2,4,8,10-tetraoxa-3,9-diphosphaspiro[5,5]undecane,3,9-di(2-phenylethyl)-3,9-dioxide (FR-6)

436.4 g (1.0 mol) of 3,9-di(2-phenylethoxy)-2,4,8,10-tetraoxa-3,9-diphosphaspiro[5,5]undecane and 370.1 g (2.0 mol) of 2-phenylethyl bromide were charged into a reactor equipped with a stirrer, thermometer and capacitor, and dry nitrogen was caused to flow into the reactor under agitation at room temperature. Thereafter, heating was started with an oil bath which was kept at 180° C. for 10 hours. The oil bath was removed to cool the reactor to room temperature. 2,000 ml of methanol was added to the obtained reaction product which was a white solid and stirred to clean the reaction product, and the white powder was separated by filtration with a glass filter. Then, the separated white powder was cleaned with 2,000 ml of a 50 wt % aqueous solution of methanol and dried at 100 Pa and 120° C. for 8 hours to produce 362.3 g of 2,4,8,10-tetraoxa-3,9-diphosphaspiro[5,5]undecane,3,9-di (2-phenylethyl)-3,9-dioxide. It was confirmed from mass spectral analysis, $^1$H, $^{31}$P nuclear magnetic resonance spectral analysis and elemental analysis that the product was bis-2,4,8,10-tetraoxa-3,9-diphosphaspiro[5,5]undecane,3,9-di(2-phenylethyl)-3,9-dioxide. This compound had a yield of 83%, an HPLC purity of 99.3% and an acid value of 0.41 mgKOH/g.

$^1$H-NMR (CDCl$_3$, 300 MHz): δ7.1–7.4 (m, 10H), 3.85–4.65 (m, 8H), 2.90–3.05 (m, 4H), 2.1–2.3 (m, 4H), $^{31}$P-NMR (CDCl$_3$, 120 MHz): δ31.5 (S), melting point: 245–246° C.

Preparation Example 7

Preparation of 2,4,8,10-tetraoxa-3,9-diphosphaspiro[5,5]undecane,3,9-bis(diphenylmethyl)-3,9-dioxide (FR-7)

2,058.5 g (7.22 mol) of diphenylmethylphosphonic acid dichloride, 468.1 g, (3.44 mol) of pentaerythritol, 1,169.4 g (14.8 mol) of pyridine and 8,200 g of chloroform were charged into a 10-liter three-necked flask equipped with a stirrer, agitating element, reflux condenser and thermometer, heated up to 60° C. in a nitrogen stream and stirred for 6 hours. After the end of a reaction, chloroform was substituted by methylene chloride, and 6 liters of distilled water was added to the reaction mixture and stirred to precipitate a white powder. The white powder was collected by suction filtration, and the obtained white product was cleaned with methanol and dried at 100° C. and 1.33×10$^2$ Pa for 10 hours to produce 1,156.2 g of a white solid. It was confirmed from $^{31}$P-NMR, $^1$H-NMR spectrum and elemental analysis that the obtained solid was 2,4,8,10-tetraoxa-3,9-diphosphaspiro[5,5]undecane,3,9-bis(diphenylmethyl)-3,9-dioxide. This compound had a $^{31}$P-NMR purity of 99%. It had an HPLC purity measured by the method of this text of 99% and an acid value of 0.3 mgKOH/g.

$^1$H-NMR (DMSO-d6, 300 MHz): δ7.20–7.60 (m, 20H), 5.25 (d, 2H), 4.15–4.55 (m, 8H), $^{31}$P-NMR (DMSO-d6, 120 MHz): δ20.9 (S), melting point: 265° C., elemental analysis calculated values: C, 66.43; H, 5.39, measurement values: C, 66.14; H, 5.41.

Preparation Example 8

Preparation of 2,4,8,10-tetraoxa-3,9-diphosphaspiro[5,5]undecane,3,9-bis(diphenylmethyl)-3,9-dioxide (FR-8)

560.5 g (1.0 mol) of 3,9-bis(diphenylmethoxy)-2,4,8,10-tetraoxa-3,9-diphosphaspiro[5,5]undecane and 494.3 g (2.0 mol) of diphenylmethyl bromide were charged into a reactor equipped with a stirrer, thermometer and capacitor, and dry nitrogen was caused to flow into the reactor under agitation at room temperature. Thereafter, heating was started with an oil bath which was kept at 150° C. for 15 minutes. The oil bath was removed to cool the reactor to room temperature. 2,000 ml of acetone was added to the obtained reaction product which was a white solid and stirred to clean the reaction product, and the white powder was separated by filtration with a glass filter. Then, the separated white powder was cleaned with 2,000 ml of a 50 wt % aqueous solution of methanol and dried at 100 Pa and 120° C. for 8 hours to produce 398.0 g of 2,4,8,10-tetraoxa-3,9-diphosphaspiro[5,5]undecane,3,9-bis(diphenylmethyl)-3,9-dioxide. It was confirmed from mass spectral analysis, $^1$H, $^{31}$P nuclear magnetic resonance spectral analysis and elemental analysis that the product was 2,4,8,10-tetraoxa-3,9-diphosphaspiro[5,5]undecane,3,9-bis(diphenylmethyl)-3,9-dioxide. This compound had a yield of 71%, an HPLC purity of 99.1% and an acid value of 0.39 mgKOH/g.

$^1$H-NMR (DMSO-d6, 300 MHz): δ7.20–7.60 (m, 20H), 5.25 (d, 2H), 4.15–4.55 (m, 8H), $^{31}$P-NMR (DMSO-d6, 120 MHz): δ20.9 (S), melting point: 264° C.

Preparation Example 9

Preparation of 2,4,8,10-tetraoxa-3,9-diphosphaspiro[5,5]undecane,3,9-bis(diphenylmethyl)-3,9-dioxide (FR-9)

560.5 g (1.0 mol) of 3,9-bis(diphenylmethoxy)-2,4,8,10-tetraoxa-3,9-diphosphaspiro[5,5]undecane and 494.3 g (2.0 mol) of diphenylmethyl bromide were charged into a reactor equipped with a stirrer, thermometer and capacitor, and dry nitrogen was caused to flow into the reactor under agitation at room temperature. Thereafter, heating was started with an oil bath which was kept at 150° C. for 15 minutes. The oil bath was removed to cool the reactor to room temperature. 2,000 ml of acetone was added to the obtained reaction product which was a white solid and stirred to clean the reaction product, and the white powder was separated by filtration with a glass filter. Then, the separated white powder was cleaned with 2,000 ml of a 50 wt % aqueous solution of methanol and dried at 100 Pa and 120° C. for 8 hours to produce 409.6 g of 2,4,8,10-tetraoxa-3,9-diphosphaspiro[5,5]undecane,3,9-bis(diphenylmethyl)-3,9-dioxide. It was confirmed from mass spectral analysis, $^1$H, $^{31}$P nuclear magnetic resonance spectral analysis and elemental analysis that the product was 2,4,8,10-tetraoxa-3,9-diphosphaspiro[5,5]undecane,3,9-bis(diphenylmethyl)-3,9-dioxide. This compound had a yield of 73%, an HPLC purity of 99.2% and an acid value of 0.63 mgKOH/g.

$^1$H-NMR (DMSO-d6, 300 MHz): δ7.20–7.60 (m, 20H), 5.25 (d, 2H), 4.15–4.55 (m, 8H), $^{31}$P-NMR (DMSO-d6, 120 MHz): δ20.9 (S), melting point: 264° C.

The following components were used in Examples and Comparative Examples.

(I) Polyester Resins (Component A-1)
(1) polybutylene terephthalate (TRB-H of Teijin Limited) (to be referred to as PBT-1 hereinafter), MVR value measured under a load of 3.8 kg at 230° C. of 9.5 cm$^3$/10 mm
(2) polybutylene terephthalate (TRB-J of Teijin Limited) (to be referred to as PBT-2 hereinafter), MVR value measured under a load of 3.8 kg at 230° C. of 12.5 cm$^3$/10 mm
(3) polyethylene terephthalate (TR-8580H of Teijin Limited) (to be referred to as PET-1 hereinafter), MVR value measured under a load of 1.2 kg at 280° C. of 42.4 cm$^3$/10 min
(4) polyethylene terephthalate (TR-8550T of Teijin Limited), (to be referred to as PET-2 hereinafter), MVR value measured under a load of 1.2 kg at 280° C. of 51.5 cm$^3$/10 min (II) Thermoplastic Resins (Component A-2)
(1) polyphenylene ether (Zylon P-402 of Asahi Chemical Industry Co., Ltd.) (to be referred to as "PPE" hereinafter)

(2) polycarbonate (Panlite L-1225WP of Teijin Chemicals Ltd.), (to be referred to as "PC" hereinafter)
(3) nylon 6 (NF-8020 of Teijin Limited) (to be referred to as "PA" hereinafter)
(4) ABS resin (Suntac UT-61 of Nippon A and L Co., Ltd.), (to be referred to as "ABS" hereinafter)

(III) Organic Phosphorus Compounds (Component B-1)
(1) 2,4,8,10-tetraoxa-3,9-diphosphaspiro[5,5]undecane,3,9-dibenzyl-3,9-dioxide synthesized in Preparation Example 1 {phosphorus-based compound of the above general formula (1) in which $X_1$ and $X_2$ are the same, AL is a methylene group, Ar is a phenyl group, and n is 1 (to be referred to as "FR-1" hereinafter)}
(2) 2,4,8,10-tetraoxa-3,9-diphosphaspiro[5,5]undecane,3,9-dibenzyl-3,9-dioxide synthesized in Preparation Example 2 {phosphorus-based compound of the above general formula (1) in which $X_1$ and $X_2$ are the same, AL is a methylene group, Ar is a phenyl group, and n is 1 (to be referred to as "FR-2" hereinafter)}
(3) 2,4,8,10-tetraoxa-3,9-diphosphaspiro[5,5]undecane,3,9-dibenzyl-3,9-dioxide having a high acid value synthesized in Preparation Example 3 {phosphorus-based compound of the above general formula (1) in which $X_1$ and $X_2$ are the same, AL is a methylene group, Ar is a phenyl group, and n is 1 (to be referred to as "FR-3" hereinafter)}
(4) 2,4,8,10-tetraoxa-3,9-diphosphaspiro[5,5]undecane,3,9-diα-methylbenzyl-3,9-dioxide synthesized in Preparation Example 4 {phosphorus-based compound of the above general formula (1) in which $X_1$ and $X_2$ are the same, AL is —CH(CH$_3$)—, Ar is a phenyl group, and n is 1 (to be referred to as "FR-4" hereinafter)}
(5) 2,4,8,10-tetraoxa-3,9-diphosphaspiro[5,5]undecane,3,9-di(2-phenylethyl)-3,9-dioxide synthesized in Preparation Example 5 {phosphorus-based compound of the above general formula (1) in which $X_1$ and $X_2$ are the same, AL is an ethylene group, Ar is a phenyl group, and n is 1 (to be referred to as "FR-5" hereinafter)}
(6) 2,4,8,10-tetraoxa-3,9-diphosphaspiro[5,5]undecane,3,9-di(2-phenylethyl)-3,9-dioxide synthesized in Preparation Example 6 {phosphorus-based compound of the above general formula (1) in which $X_1$ and $X_2$ are the same, AL is an ethylene group, Ar is a phenyl group, and n is 1 (to be referred to as "FR-6" hereinafter)}
(7) 2,4,8,10-tetraoxa-3,9-diphosphaspiro[5,5]undecane,3,9-bis(diphenylmethyl)-3,9-dioxide synthesized in Preparation Example 7 {phosphorus-based compound of the above general formula (1) in which $X_1$ and $X_2$ are the same, AL is a methine group, Ar is a phenyl group, and n is 2 (to be referred to as "FR-7" hereinafter)}
(8) 2,4,8,10-tetraoxa-3,9-diphosphaspiro[5,5]undecane,3,9-bis(diphenylmethyl)-3,9-dioxide synthesized in Preparation Example 8 {phosphorus-based compound of the above general formula (1) in which $X_1$ and $X_2$ are the same, AL is a methine group, Ar is a phenyl group, and n is 2 (to be referred to as "FR-8" hereinafter)}(9) 2,4,8,10-tetraoxa-3,9-diphosphaspiro[5,5]undecane,3,9-bis(diphenylmethyl)-3,9-dioxide synthesized in Preparation Example 9 {phosphorus-based compound of the above general formula (1) in which $X_1$ and $X_2$ are the same, AL is a methine group, Ar is a phenyl group, and n is 2 (to be referred to as "FR-9" hereinafter)}

(IV) Organic Phosphorus Compound (Component B-2)
6H-benzo[c,e][1,2]oxaphospholin-6-one {compound of the above general formula (2) in which $R^1$ to $R^8$ are all hydrogen atoms, HCA of Sanko Co., Ltd. (to be referred to as "FR-10" hereinafter)}
(V) Biscumyl Compound (Component B-3) biscumyl {compound of the above general formula (3) in which $R^9$ to $R^{18}$ are all hydrogen atoms, Nofmer BC 90 of NOF Corporation (to be referred to as "BC" hereinafter)}

(VI) Other Organic Phosphorus Compounds
(1) triphenyl phosphate {TPP of Daihachi Chemical Industry, Co., Ltd. (to be referred to as "TPP" hereinafter)}
(2) 1,3-phenylenebis[di(2,6-dimethylphenyl)phosphate]{organic phosphate compound of the above general formula (F-3) in which $Ar^4$ is a phenylene group, and $Q^1$, $Q^2$, $Q^3$ and $Q^4$ are each a 2,6-dimethylphenyl group, Adecastaf FP-500 of Asahi Denka Kogyo K.K. (to be referred to as "FP-500" hereinafter)}

(VII) Flame Retardancy Improving Resins (Component C)
(1) polystyrene GPPS (styrene polymer of Wako Junyaku, Co., Ltd.) (to be referred to as "C-1" hereinafter)
(2) acrylonitrile-styrene copolymer (Stylac-AS783 of Asahi Chemical Industry Co., Ltd.) (to be referred to as "C-2" hereinafter)
(3) phenolic resin (PR-53195 of Sumitomo Bakelite Co., Ltd.) (to be referred to as "C-3")
(4) epoxy resin (Epicoat 828 of Japan Epoxy Resin Co., Ltd.) (to be referred to as "C-4")

(VIII) Fillers (Component D)
(1) glass milled fiber (PFE-301S of Nitto Boseki Co., Ltd.) (to be referred to as "D-1" hereinafter)
(2) glass chopped fiber (ECS03T-187H of Nippon Electric Glass Co., Ltd.) (to be referred to as "D-2" hereinafter)

(IX) Fluorine-containing Resins (Component E)
(1) polytetrafluoroethylene (Polyfuron MPAFA-500 of Daikin Industries, Ltd.) (to be referred to as "E-1" hereinafter)
(2) AS coated polytetrafluoroethylene (BLENDEX449 of GE Specialty Chemicals Co., Ltd.) (to be referred to as "E-2" hereinafter)

The BLENDEX449 had a PTFE content of 50%, an acrylonitrile content of 10% and a styrene content of 40%.

Examples a-1 to a-33, Examples b-1 to b-26,
Examples c-1 to c-33, Examples d-1 to d-35,
Examples e-1 to e-44, and Comparative Examples
1 to 82

Components shown in Tables 1 to 6 were mixed together by a tumbler in amounts (parts by weight) shown in Tables 1 to 6 and pelletized by a 15 mm-diameter double-screw extruder (KZW15 of Technovel Co., Ltd.). Compositions comprising a glass chopped fiber were pelletized by a 30 mm-diameter single-screw extruder. The obtained pellets were dried with 130° C. hot air by a drier for 4 hours. The dried pellets were molded by an injection molding machine (J75Si of Nippon Steel Co., Ltd.). The evaluation results of molded plates are shown in Tables 1 to 6.

TABLES 1

| Component | Unit | Ex. a-1 | Ex. a-2 | Ex. a-3 | Ex. a-4 | Ex. a-5 | Ex. a-6 | Ex. a-7 | Ex. a-8 | Ex. a-9 | Ex. a-10 | Ex. a-11 |
|---|---|---|---|---|---|---|---|---|---|---|---|---|
| A-1 Component | Type | PBT-1 | PBT-1 | PBT-2 | PBT-1 | PBT-2 | PET-1 | PET-1 | PBT-2 | PBT-2 | PBT-2 | PBT-2 |
| | Parts by weight | 100 | 100 | 100 | 100 | 100 | 100 | 100 | 100 | 100 | 100 | 100 |
| A-2 Component | Type | — | — | — | — | — | — | — | — | — | — | — |
| | Parts by weight | — | — | — | — | — | — | — | — | — | — | — |
| B-1 Component | Type | FR-1 | FR-1 | FR-1 | FR-2 | FR-2 | FR-1 | FR-1 | FR-1 | FR-1 | FR-1 | FR-1 |
| | Parts by weight | 15 | 20 | 20 | 20 | 20 | 20 | 20 | 25 | 28.6 | 25 | 28.6 |
| C Component | Type | — | — | — | — | — | — | — | — | — | — | — |
| | Parts by weight | — | — | — | — | — | — | — | — | — | — | — |
| D Component | Type | — | — | — | — | — | — | — | D-1 | D-1 | D-2 | D-2 |
| | Parts by weight | — | — | — | — | — | — | — | 25 | 42.9 | 25 | 42.9 |
| E Component | Type | — | — | — | — | — | — | — | — | — | — | — |
| | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | V-0 | V-0 | V-0 | V-0 | V-0 | V-0 | V-0 | V-0 | V-0 | V-2 | V-2 |
| | Drips | Seen | Seen | Seen | Seen | Seen | Seen | Seen | Seen | Seen | Seen | Seen |
| | Ignition of cotton | Not seen | Not seen | Not seen | Not seen | Not seen | Not seen | Not seen | Not seen | Not seen | Seen | Seen |
| | L.O.I. | 28.0 | 28.3 | 28.8 | 28.5 | 28.6 | 28.8 | 28.3 | 28.6 | 28.5 | 24.1 | 23.8 |

| Component | Unit | Ex. a-12 | Ex. a-13 | Ex. a-14 | Ex. a-15 | Ex. a-16 | Ex. a-17 | Ex. a-18 | Ex. a-19 | Ex. a-20 | Ex. a-21 | Ex. a-22 |
|---|---|---|---|---|---|---|---|---|---|---|---|---|
| A-1 Component | Type | PBT-1 | PBT-1 | PBT-2 | PBT-1 | PBT-2 | PBT-1 | PBT-1 | PBT-2 | PBT-2 | PBT-2 | PBT-2 |
| | Parts by weight | 100 | 100 | 100 | 100 | 100 | 95 | 90 | 71.4 | 71.4 | 71.4 | 71.4 |
| A-2 Component | Type | — | — | — | — | — | ABS | ABS | PPE | PPE | PPE | PPE |
| | Parts by weight | — | — | — | — | — | 5 | 10 | 28.6 | 28.6 | 28.6 | 28.6 |
| B-1 Component | Type | FR-1 | FR-1 | FR-1 | FR-1 | FR-1 | FR-1 | FR-1 | FR-1 | FR-1 | FR-1 | FR-1 |
| | Parts by weight | 10 | 15 | 15 | 15 | 15 | 30 | 30 | 28.6 | 42.9 | 28.6 | 42.9 |
| C Component | Type | C-1 | C-1 | C-1 | C-2 | C-2 | — | — | — | — | — | — |
| | Parts by weight | 1 | 1 | 1 | 1 | 1 | — | — | — | — | — | — |

TABLES 1-continued

| Component | | Unit | Ex. a-23 | Ex. a-24 | Ex. a-25 | Ex. a-26 | Ex. a-27 | Ex. a-28 | Ex. a-29 | Ex. a-30 | Ex. a-31 | Ex. a-32 | Ex. a-33 |
|---|---|---|---|---|---|---|---|---|---|---|---|---|---|
| D Component | Type | | — | — | — | — | — | — | — | D-2 | D-2 | D-2 | D-2 |
| | Parts by weight | | — | — | — | — | — | — | — | 42.9 | 42.9 | 42.9 | 42.9 |
| E Component | Type | | — | — | — | — | — | — | — | E-1 | E-1 | E-2 | E-2 |
| | Parts by weight | | — | — | — | — | — | — | — | 1.4 | 1.4 | 1.8 | 1.8 |
| Flame retardancy | Thickness of specimen | | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | | V-0 | V-0 | V-0 | V-0 | V-0 | V-0 | V-0 | V-0 | V-0 | V-0 | V-0 |
| | Drips | | Seen | Seen | Seen | Seen | Seen | Seen | Seen | Not seen | Not seen | Not seen | Not seen |
| | Ignition of cotton | | Not seen | Not seen | Not seen | Not seen | Not seen | Not seen | Not seen | Not seen | Not seen | Not seen | Not seen |
| | L.O.I. | | 27.4 | 27.8 | 27.3 | 28.3 | 28.1 | 26.5 | 27.2 | 28.1 | 28.5 | 28.2 | 28.8 |

| Component | | Unit | Ex. a-23 | Ex. a-24 | Ex. a-25 | Ex. a-26 | Ex. a-27 | Ex. a-28 | Ex. a-29 | Ex. a-30 | Ex. a-31 | Ex. a-32 | Ex. a-33 |
|---|---|---|---|---|---|---|---|---|---|---|---|---|---|
| A-1 Component | Type | | PBT-2 | PBT-2 | PBT-2 | PBT-2 | PBT-1 | PBT-2 | PBT-1 | PBT-2 | PBT-2 | PBT-2 | PBT-2 |
| | Parts by weight | | 64.3 | 71.4 | 100 | 100 | 100 | 100 | 100 | 100 | 100 | 71.4 | 71.4 |
| A-2 Component | Type | | PC | PA | — | — | — | — | — | — | — | PPE | PPE |
| | Parts by weight | | 35.7 | 28.6 | — | — | — | — | — | — | — | 28.6 | 28.6 |
| B-1 Component | Type | | FR-1 | FR-1 | FR-1 | FR-1 | FR-1 | FR-1 | FR-2 | FR-2 | FR-1 | FR-1 | FR-1 |
| | Parts by weight | | 42.9 | 42.9 | 60 | 60 | 20 | 20 | 20 | 20 | 28.6 | 42.9 | 42.9 |
| C Component | Type | | — | — | C-3 | C-4 | — | — | — | — | — | — | — |
| | Parts by weight | | — | — | 40 | 40 | — | — | — | — | — | — | — |
| D Component | Type | | D-2 | D-2 | D-2 | D-2 | — | — | — | — | D-1 | D-2 | D-2 |
| | Parts by weight | | 42.9 | 42.9 | 60 | 60 | — | — | — | — | 42.9 | 42.9 | 42.9 |
| E Component | Type | | E-2 | E-1 | E-1 | E-1 | — | — | — | — | — | E-1 | E-2 |
| | Parts by weight | | 1.8 | 1.4 | 2 | 2 | — | — | — | — | — | 1.4 | 1.8 |
| Flame retardancy | Thickness of specimen | | 1.6 mm | 1.6 mm | 1.6 mm | 1.6 mm | 0.8 mm | 0.8 mm | 0.8 mm | 0.8 mm | 0.8 mm | 0.8 mm | 0.8 mm |
| | UL rating | | V-0 | V-0 | V-0 | V-0 | V-0 | V-0 | V-0 | V-0 | V-0 | V-0 | V-0 |
| | Drips | | Not seen | Not seen | Not seen | Not seen | Seen | Seen | Seen | Seen | Seen | Not seen | Not seen |
| | Ignition of cotton | | Not seen | Not seen | Not seen | Not seen | Not seen | Not seen | Not seen | Not seen | Not seen | Not seen | Not seen |
| | L.O.I. | | 30.2 | 31.0 | 31.8 | 31.5 | 28.3 | 28.8 | 28.5 | 28.6 | 28.5 | 28.5 | 28.8 |

Ex. = Example

TABLES 2

| Component | Unit | Ex. b-1 | Ex. b-2 | Ex. b-3 | Ex. b-4 | Ex. b-5 | Ex. b-6 | Ex. b-7 | Ex. b-8 | Ex. b-9 | Ex. b-10 | Ex. b-11 |
|---|---|---|---|---|---|---|---|---|---|---|---|---|
| A-1 Component | Type | PBT-1 | PBT-2 | PBT-2 | PET-1 | PET-2 | PBT-2 | PBT-2 | PBT-2 | PBT-1 | PBT-1 | PBT-2 |
|  | Parts by weight | 100 | 100 | 100 | 100 | 100 | 100 | 100 | 100 | 100 | 100 | 100 |
| A-2 Component | Type | — | — | — | — | — | — | — | — | — | — | — |
|  | Parts by weight | — | — | — | — | — | — | — | — | — | — | — |
| B-1 Component | Type | FR-4 | FR-4 | FR-4 | FR-4 | FR-4 | FR-4 | FR-4 | FR-4 | FR-4 | FR-4 | FR-4 |
|  | Parts by weight | 20 | 15 | 20 | 20 | 20 | 25 | 28.6 | 28.6 | 10 | 15 | 15 |
| C Component | Type | — | — | — | — | — | — | — | — | C-1 | C-1 | C-1 |
|  | Parts by weight | — | — | — | — | — | — | — | — | 1 | 1 | 1 |
| D Component | Type | — | — | — | — | — | D-1 | D-1 | D-2 | — | — | — |
|  | Parts by weight | — | — | — | — | — | 25 | 42.9 | 42.9 | — | — | — |
| E Component | Type | — | — | — | — | — | — | — | — | — | — | — |
|  | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | V-0 | V-0 | V-0 | V-0 | V-0 | V-0 | V-0 | V-2 | V-0 | V-0 | V-0 |
|  | Drips | Seen | Seen | Seen | Seen | Seen | Seen | Seen | Seen | Seen | Seen | Seen |
|  | Ignition of cotton | Not seen | Not seen | Not seen | Not seen | Not seen | Not seen | Not seen | Seen | Not seen | Not seen | Not seen |
|  | L.O.I. | 26.7 | 27.0 | 27.0 | 26.8 | 26.9 | 26.5 | 26.3 | 23.5 | 26.7 | 27 | 27.3 |

| Component | Unit | Ex. b-12 | Ex. b-13 | Ex. b-14 | Ex. b-15 | Ex. b-16 | Ex. b-17 | Ex. b-18 | Ex. b-19 | Ex. b-20 | Ex. b-21 |
|---|---|---|---|---|---|---|---|---|---|---|---|
| A-1 Component | Type | PBT-1 | PBT-2 | PBT-2 | PBT-2 | PBT-2 | PBT-2 | PBT-2 | PBT-2 | PBT-2 | PBT-2 |
|  | Parts by weight | 100 | 100 | 71.4 | 71.4 | 71.4 | 64.3 | 71.4 | 71.4 | 100 | 100 |
| A-2 Component | Type | — | — | PPE | PPE | PPE | PC | PPE | PA | — | — |
|  | Parts by weight | — | — | 28.6 | 28.6 | 28.6 | 35.7 | 28.6 | 28.6 | — | — |
| B-1 Component | Type | FR-4 | FR-4 | FR-4 | FR-4 | FR-4 | FR-4 | FR-4 | FR-4 | FR-4 | FR-4 |
|  | Parts by weight | 15 | 15 | 28.6 | 42.9 | 28.6 | 42.9 | 42.9 | 42.9 | 60 | 60 |
| C Component | Type | C-2 | C-2 | — | — | — | — | — | — | C-3 | C-4 |
|  | Parts by weight | 1 | 1 | — | — | — | — | — | — | 40 | 40 |

TABLES 2-continued

| Component | | | | | | | | | | |
|---|---|---|---|---|---|---|---|---|---|---|
| D Component | Type<br>Parts by weight | —<br>— | —<br>— | D-2<br>42.9 | D-2<br>42.9 | D-2<br>42.9 | D-2<br>42.9 | D-2<br>42.9 | D-2<br>60 | D-2<br>60 |
| E Component | Type<br>Parts by weight | —<br>— | —<br>— | E-1<br>1.4 | E-1<br>1.4 | E-2<br>1.8 | E-2<br>1.8 | E-2<br>1.8 | E-1<br>2 | E-1<br>2 |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm |
| | UL rating | V-0 | V-0 | V-0 | V-0 | V-0 | V-0 | V-0 | V-0 | V-0 |
| | Drips | Seen | Seen | Not seen | Not seen | Not seen | Not seen | Not seen | Not seen | Not seen |
| | Ignition of cotton | Not seen | Not seen | Not seen | Not seen | Not seen | Not seen | Not seen | Not seen | Not seen |
| | L.O.I. | 27.2 | 27.5 | 28.2 | 28.8 | 28.5 | 28.7 | 29.6 | 30.5 | 30.8 | 31.2 |

| Component | | Unit | Ex. b-22 | Ex. b-23 | Ex. b-24 | Ex. b-25 | Ex. b-26 |
|---|---|---|---|---|---|---|---|
| A-1 Component | Type<br>Parts by weight | | PBT-1<br>100 | PBT-2<br>100 | PBT-2<br>100 | PBT-2<br>71.4 | PBT-2<br>71.4 |
| A-2 Component | Type<br>Parts by weight | | —<br>— | —<br>— | —<br>— | PPE<br>28.6 | PPE<br>28.6 |
| B-1 Component | Type<br>Parts by weight | | FR-4<br>20 | FR-4<br>20 | FR-4<br>28.6 | FR-4<br>42.9 | FR-4<br>42.9 |
| C Component | Type<br>Parts by weight | | —<br>— | —<br>— | —<br>— | —<br>— | —<br>— |
| D Component | Type<br>Parts by weight | | —<br>— | —<br>— | D-1<br>42.9 | D-2<br>42.9 | D-2<br>42.9 |
| E Component | Type<br>Parts by weight | | —<br>— | —<br>— | —<br>— | E-1<br>1.4 | E-2<br>1.8 |
| Flame retardancy | Thickness of specimen | | 0.8 mm | 0.8 mm | 0.8 mm | 0.8 mm | 0.8 mm |
| | UL rating | | V-0 | V-0 | V-0 | V-0 | V-0 |
| | Drips | | Seen | Seen | Seen | Not seen | Not seen |
| | Ignition of cotton | | Not seen | Not seen | Not seen | Not seen | Not seen |
| | L.O.I. | | 26.7 | 27.0 | 26.3 | 28.8 | 29.6 |

Ex. = Example

TABLES 3

| Component | Unit | Ex. c-1 | Ex. c-2 | Ex. c-3 | Ex. c-4 | Ex. c-5 | Ex. c-6 | Ex. c-7 | Ex. c-8 | Ex. c-9 | Ex. c-10 | Ex. c-11 |
|---|---|---|---|---|---|---|---|---|---|---|---|---|
| A-1 Component | Type | PBT-1 | PBT-1 | PBT-2 | PBT-2 | PBT-1 | PBT-2 | PET-1 | PET-2 | PBT-2 | PBT-2 | PBT-2 |
| | Parts by weight | 100 | 100 | 100 | 100 | 100 | 100 | 100 | 100 | 100 | 100 | 100 |
| A-2 Component | Type | — | — | — | — | — | — | — | — | — | — | — |
| | Parts by weight | — | — | — | — | — | — | — | — | — | — | — |
| B-1 Component | Type | FR-5 | FR-5 | FR-5 | FR-5 | FR-6 | FR-6 | FR-5 | FR-5 | FR-5 | FR-5 | FR-5 |
| | Parts by weight | 15 | 20 | 15 | 20 | 15 | 15 | 20 | 20 | 25 | 28.6 | 28.6 |
| C Component | Type | — | — | — | — | — | — | — | — | — | — | — |
| | Parts by weight | — | — | — | — | — | — | — | — | — | — | — |
| D Component | Type | — | — | — | — | — | — | — | — | D-1 | D-1 | D-2 |
| | Parts by weight | — | — | — | — | — | — | — | — | 25 | 42.9 | 42.9 |
| E Component | Type | — | — | — | — | — | — | — | — | — | — | — |
| | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | V-0 | V-0 | V-0 | V-0 | V-0 | V-0 | V-0 | V-0 | V-0 | V-0 | V-2 |
| | Drips | Seen | Seen | Seen | Seen | Seen | Seen | Seen | Seen | Seen | Seen | Seen |
| | Ignition of cotton | Not seen | Not seen | Not seen | Not seen | Not seen | Not seen | Not seen | Not seen | Not seen | Not seen | Seen |
| | L.O.I. | 27.5 | 27.8 | 27.3 | 28.3 | 27.4 | 27.5 | 27.0 | 26.8 | 28.3 | 28.0 | 23.2 |

| Component | Unit | Ex. c-12 | Ex. c-13 | Ex. c-14 | Ex. c-15 | Ex. c-16 | Ex. c-17 | Ex. c-18 | Ex. c-19 | Ex. c-20 | Ex. c-21 | Ex. c-22 |
|---|---|---|---|---|---|---|---|---|---|---|---|---|
| A-1 Component | Type | PBT-1 | PBT-1 | PBT-2 | PBT-1 | PBT-2 | PBT-1 | PBT-1 | PBT-2 | PBT-2 | PBT-2 | PBT-2 |
| | Parts by weight | 100 | 100 | 100 | 100 | 100 | 95 | 90 | 71.4 | 71.4 | 71.4 | 71.4 |
| A-2 Component | Type | — | — | — | — | — | ABS | ABS | PPE | PPE | PPE | PPE |
| | Parts by weight | — | — | — | — | — | 5 | 10 | 28.6 | 28.6 | 28.6 | 28.6 |
| B-1 Component | Type | FR-5 | FR-5 | FR-5 | FR-5 | FR-5 | FR-5 | FR-5 | FR-5 | FR-5 | FR-5 | FR-5 |
| | Parts by weight | 10 | 15 | 15 | 15 | 15 | 30 | 30 | 28.6 | 42.9 | 28.6 | 42.9 |
| C Component | Type | C-1 | C-1 | C-1 | C-2 | C-2 | — | — | — | — | — | — |
| | Parts by weight | 1 | 1 | 1 | 1 | 1 | — | — | — | — | — | — |

TABLES 3-continued

| | | Ex. c-23 | Ex. c-24 | Ex. c-25 | Ex. c-26 | Ex. c-27 | Ex. c-28 | Ex. c-29 | Ex. c-30 | Ex. c-31 | Ex. c-32 | Ex. c-33 |
|---|---|---|---|---|---|---|---|---|---|---|---|---|
| D Component | Type | — | — | — | — | — | — | — | D-2 | D-2 | D-2 | D-2 |
| | Parts by weight | — | — | — | — | — | — | — | 42.9 | 42.9 | 42.9 | 42.9 |
| E Component | Type | — | — | — | — | — | — | — | E-1 | E-1 | E-2 | E-2 |
| | Parts by weight | — | — | — | — | — | — | — | 1.4 | 1.4 | 1.8 | 1.8 |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | V-0 | V-0 | V-0 | V-0 | V-0 | V-0 | V-0 | V-0 | V-0 | V-0 | V-0 |
| | Drips | Seen | Seen | Seen | Seen | Seen | Seen | Seen | Not seen | Not seen | Not seen | Not seen |
| | Ignition of cotton | Not seen | Not seen | Not seen | Not seen | Not seen | Not seen | Not seen | Not seen | Not seen | Not seen | Not seen |
| | L.O.I. | 27.3 | 28.1 | 27.8 | 28.5 | 28.3 | 27.2 | 26.8 | 28.5 | 28.8 | 28.3 | 28.8 |

| Component | Unit | Ex. c-23 | Ex. c-24 | Ex. c-25 | Ex. c-26 | Ex. c-27 | Ex. c-28 | Ex. c-29 | Ex. c-30 | Ex. c-31 | Ex. c-32 | Ex. c-33 |
|---|---|---|---|---|---|---|---|---|---|---|---|---|
| A-1 Component | Type | PBT-2 | PBT-2 | PBT-2 | PBT-2 | PBT-1 | PBT-2 | PBT-1 | PBT-2 | PBT-2 | PBT-2 | PBT-2 |
| | Parts by weight | 64.3 | 71.4 | 100 | 100 | 100 | 100 | 100 | 100 | 100 | 71.4 | 71.4 |
| A-2 Component | Type | PC | PA | — | — | — | — | — | — | — | PPE | PPE |
| | Parts by weight | 35.7 | 28.6 | — | — | — | — | — | — | — | 28.6 | 28.6 |
| B-1 Component | Type | FR-5 | FR-5 | FR-5 | FR-5 | FR-5 | FR-5 | FR-6 | FR-6 | FR-5 | FR-5 | FR-5 |
| | Parts by weight | 42.9 | 42.9 | 60 | 60 | 20 | 20 | 20 | 20 | 28.6 | 42.9 | 42.9 |
| C Component | Type | — | — | C-3 | C-4 | — | — | — | — | — | — | — |
| | Parts by weight | — | — | 40 | 40 | — | — | — | — | — | — | — |
| D Component | Type | D-2 | D-2 | D-2 | D-2 | — | — | — | — | D-1 | D-2 | D-2 |
| | Parts by weight | 42.9 | 42.9 | 60 | 60 | — | — | — | — | 42.9 | 42.9 | 42.9 |
| E Component | Type | E-2 | E-1 | E-1 | E-1 | — | — | — | — | — | E-1 | E-2 |
| | Parts by weight | 1.8 | 1.4 | 2 | 2 | — | — | — | — | — | 1.4 | 1.8 |
| Flame retardancy | Thickness of specimen | 1.6 mm | 1.6 mm | 1.6 mm | 1.6 mm | 0.8 mm | 0.8 mm | 0.8 mm | 0.8 mm | 0.8 mm | 0.8 mm | 0.8 mm |
| | UL rating | V-0 | V-0 | V-0 | V-0 | V-0 | V-0 | V-0 | V-0 | V-0 | V-0 | V-0 |
| | Drips | Not seen | Not seen | Not seen | Not seen | Seen | Seen | Seen | Seen | Seen | Not seen | Not seen |
| | Ignition of cotton | Not seen | Not seen | Not seen | Not seen | Not seen | Not seen | Not seen | Not seen | Not seen | Not seen | Not seen |
| | L.O.I. | 30.0 | 31.5 | 31.2 | 30.8 | 27.8 | 28.3 | 27.5 | 27.8 | 28.0 | 28.8 | 30.0 |

Ex. = Example

TABLES 4

| Component | Unit | Ex. d-1 | Ex. d-2 | Ex. d-3 | Ex. d-4 | Ex. d-5 | Ex. d-6 | Ex. d-7 | Ex. d-8 | Ex. d-9 | Ex. d-10 | Ex. d-11 |
|---|---|---|---|---|---|---|---|---|---|---|---|---|
| A-1 Component | Type | PBT-1 | PBT-2 | PBT-1 | PBT-2 | PBT-1 | PBT-2 | PET-1 | PET-2 | PBT-2 | PBT-2 | PBT-2 |
|  | Parts by weight | 100 | 100 | 100 | 100 | 100 | 100 | 100 | 100 | 100 | 100 | 100 |
| A-2 Component | Type | — | — | — | — | — | — | — | — | — | — | — |
|  | Parts by weight | — | — | — | — | — | — | — | — | — | — | — |
| B-1 Component | Type | FR-7 | FR-7 | FR-8 | FR-8 | FR-9 | FR-9 | FR-7 | FR-7 | FR-7 | FR-7 | FR-7 |
|  | Parts by weight | 20 | 20 | 20 | 20 | 20 | 20 | 20 | 20 | 25 | 28.6 | 25 |
| C Component | Type | — | — | — | — | — | — | — | — | — | — | — |
|  | Parts by weight | — | — | — | — | — | — | — | — | — | — | — |
| D Component | Type | — | — | — | — | — | — | — | — | D-1 | D-1 | D-2 |
|  | Parts by weight | — | — | — | — | — | — | — | — | 25 | 42.9 | 25 |
| E Component | Type | — | — | — | — | — | — | — | — | — | — | — |
|  | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | V-0 | V-0 | V-0 | V-0 | V-0 | V-0 | V-0 | V-0 | V-0 | V-0 | V-2 |
|  | Drips | Seen | Seen | Seen | Seen | Seen | Seen | Seen | Seen | Seen | Seen | Seen |
|  | Ignition of cotton | Not seen | Not seen | Not seen | Not seen | Not seen | Not seen | Not seen | Not seen | Not seen | Not seen | Seen |
|  | L.O.I. | 28.0 | 28.8 | 27.8 | 28.5 | 27.7 | 28.3 | 28.5 | 28.3 | 28.5 | 28.3 | 22.8 |

| Component | Unit | Ex. d-12 | Ex. d-13 | Ex. d-14 | Ex. d-15 | Ex. d-16 | Ex. d-17 | Ex. d-18 | Ex. d-19 | Ex. d-20 | Ex. d-21 | Ex. d-22 |
|---|---|---|---|---|---|---|---|---|---|---|---|---|
| A-1 Component | Type | PBT-2 | PBT-2 | PBT-2 | PBT-2 | PBT-2 | PBT-2 | PBT-2 | PBT-2 | PBT-2 | PBT-2 | PBT-2 |
|  | Parts by weight | 100 | 100 | 100 | 100 | 100 | 71.4 | 71.4 | 71.4 | 71.4 | 64.3 | 71.4 |
| A-2 Component | Type | — | — | — | — | — | PPE | PPE | PPE | PPE | PC | PA |
|  | Parts by weight | — | — | — | — | — | 28.6 | 28.6 | 28.6 | 28.6 | 35.7 | 28.6 |
| B-1 Component | Type | FR-7 | FR-7 | FR-7 | FR-7 | FR-7 | FR-7 | FR-7 | FR-7 | FR-7 | FR-7 | FR-7 |
|  | Parts by weight | 28.6 | 15 | 15 | 15 | 15 | 28.6 | 42.9 | 28.6 | 42.9 | 42.9 | 28.6 |
| C Component | Type | — | C-1 | C-1 | C-2 | C-2 | — | — | — | — | — | — |
|  | Parts by weight | — | 1 | 1 | 1 | 1 | — | — | — | — | — | — |

TABLES 4-continued

| Component | | Unit | Ex. d-23 | Ex. d-24 | Ex. d-25 | Ex. d-26 | Ex. d-27 | Ex. d-28 | Ex. d-29 | Ex. d-30 | Ex. d-31 | Ex. d-32 | Ex. d-33 | Ex. d-34 | Ex. d-35 |
|---|---|---|---|---|---|---|---|---|---|---|---|---|---|---|---|
| D Component | Type | | | | | | | | D-2 | D-2 | D-2 | D-2 | D-2 | D-2 | D-2 |
| | Parts by weight | | | | | | | | 42.9 | 42.9 | 42.9 | 42.9 | 42.9 | 42.9 | 42.9 |
| E Component | Type | | | | | | | | E-1 | E-1 | E-1 | E-2 | E-2 | E-2 | E-1 |
| | Parts by weight | | | | | | | | 1.4 | 1.4 | 1.4 | 1.4 | 1.4 | 1.4 | 1.4 |
| Flame retardancy | Thickness of specimen | | 1.6 mm | 1.6 mm | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | | V-2 | V-0 | V-0 | V-0 | V-0 | V-0 | V-0 | V-0 | V-0 | V-0 | V-0 | V-0 | V-0 |
| | Drips | | Seen | Seen | Seen | Seen | Seen | Seen | Not seen | Not seen | Not seen | Not seen | Not seen | Not seen | Not seen |
| | Ignition of cotton | | Seen | Not seen | Not seen | Not seen | Not seen | Not seen | Not seen | Not seen | Not seen | Not seen | Not seen | Not seen | Not seen |
| | L.O.I. | | 22.5 | 30.3 | 30.2 | 30.2 | 30.3 | 28.8 | 28.0 | 28.5 | 28.5 | 28.2 | 28.5 | 29.2 | 28.8 |

| Component | | Unit | Ex. d-23 | Ex. d-24 | Ex. d-25 | Ex. d-26 | Ex. d-27 | Ex. d-28 | Ex. d-29 | Ex. d-30 | Ex. d-31 | Ex. d-32 | Ex. d-33 | Ex. d-34 | Ex. d-35 |
|---|---|---|---|---|---|---|---|---|---|---|---|---|---|---|---|
| A-1 Component | Type | | PBT-2 | PBT-2 | PBT-2 | PBT-2 | PBT-2 | PBT-1 | PBT-2 | PBT-1 | PBT-2 | PBT-2 | PBT-2 | PBT-2 | PBT-2 |
| | Parts by weight | | 71.4 | 100 | 100 | 100 | 100 | 100 | 100 | 100 | 100 | 100 | 71.4 | 71.4 | 64.3 |
| A-2 Component | Type | | PA | | | | | | | | | | PPE | PPE | PC |
| | Parts by weight | | 28.6 | | | | | | | | | | 28.6 | 28.6 | 35.7 |
| B-1 Component | Type | | FR-7 | FR-7 | FR-7 | FR-7 | FR-7 | FR-7 | FR-7 | FR-8 | FR-8 | FR-7 | FR-7 | FR-7 | FR-7 |
| | Parts by weight | | 42.9 | 60 | 60 | 60 | 60 | 20 | 20 | 20 | 20 | 28.6 | 42.9 | 42.9 | 42.9 |
| C Component | Type | | | C-3 | C-4 | C-3 | C-4 | | | | | | | | |
| | Parts by weight | | | 40 | 40 | 40 | 40 | | | | | | | | |
| D Component | Type | | D-2 | D-2 | D-2 | D-2 | D-2 | | | | | D-1 | D-2 | D-2 | D-2 |
| | Parts by weight | | 42.9 | 60 | 60 | 60 | 60 | | | | | 42.9 | 42.9 | 42.9 | 42.9 |
| E Component | Type | | E-1 | E-1 | E-1 | E-2 | E-2 | | | | | | E-1 | E-2 | E-2 |
| | Parts by weight | | 1.4 | 2 | 2 | 2 | 2 | | | | | | 1.4 | 1.4 | 1.4 |
| Flame retardancy | Thickness of specimen | | 1.6 mm | 1.6 mm | 1.6 mm | 1.6 mm | 1.6 mm | 0.8 mm | 0.8 mm | 0.8 mm | 0.8 mm | 0.8 mm | 0.8 mm | 0.8 mm | 0.8 mm |
| | UL rating | | V-0 | V-0 | V-0 | V-0 | V-0 | V-0 | V-0 | V-0 | V-0 | V-0 | V-0 | V-0 | V-0 |
| | Drips | | Not seen | Not seen | Not seen | Not seen | Not seen | Seen | Seen | Seen | Seen | Seen | Not seen | Not seen | Not seen |
| | Ignition of cotton | | Not seen | Not seen | Not seen | Not seen | Not seen | Not seen | Not seen | Not seen | Not seen | Not seen | Not seen | Not seen | Not seen |
| | L.O.I. | | 29.3 | 30.3 | 30.2 | 30.2 | 30.3 | 28.0 | 28.8 | 27.8 | 28.5 | 28.3 | 28.5 | 29.2 | 29.2 |

Ex. = Example

TABLES 5

| Component | Unit | Ex. e-1 | Ex. e-2 | Ex. e-3 | Ex. e-4 | Ex. e-5 | Ex. e-6 | Ex. e-7 | Ex. e-8 | Ex. e-9 | Ex. e-10 | Ex. e-11 |
|---|---|---|---|---|---|---|---|---|---|---|---|---|
| A-1 Component | Type | PBT-1 | PBT-1 | PBT-1 | PBT-1 | PBT-1 | PBT-2 | PBT-2 | PET-2 | PBT-2 | PBT-2 | PBT-1 |
|  | Parts by weight | 100 | 100 | 100 | 100 | 100 | 100 | 100 | 100 | 100 | 100 | 100 |
| A-2 Component | Type | — | — | — | — | — | — | — | — | — | — | — |
|  | Parts by weight | — | — | — | — | — | — | — | — | — | — | — |
| B-2 Component | Type | FR-10 | FR-10 | FR-10 | FR-10 | FR-10 | FR-10 | FR-10 | FR-10 | FR-10 | FR-10 | FR-10 |
|  | Parts by weight | 6 | 8 | 10 | 12 | 15 | 6 | 8 | 10 | 12 | 15 | 8 |
| B-3 Component | Type | BC | BC | BC | BC | BC | BC | BC | BC | BC | BC | BC |
|  | Parts by weight | 1 | 0.8 | 0.5 | 0.3 | 0.3 | 1 | 0.8 | 0.5 | 0.3 | 0.3 | 0.8 |
| C Component | Type | — | — | — | — | — | — | — | — | — | — | — |
|  | Parts by weight | — | — | — | — | — | — | — | — | — | — | — |
| D Component | Type | — | — | — | — | — | — | — | — | — | — | — |
|  | Parts by weight | — | — | — | — | — | — | — | — | — | — | — |
| E Component | Type | — | — | — | — | — | — | — | — | — | — | — |
|  | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | V-0 | V-0 | V-0 | V-0 | V-0 | V-0 | V-0 | V-0 | V-0 | V-0 | V-0 |
|  | Drips | Seen | Seen | Seen | Seen | Seen | Seen | Seen | Seen | Seen | Seen | Seen |
|  | Ignition of cotton | Not seen | Not seen | Not seen | Not seen | Not seen | Not seen | Not seen | Not seen | Not seen | Not seen | Not seen |
|  | L.O.I. | 29.3 | 29.8 | 29.8 | 29.3 | 30.3 | 29.2 | 29.3 | 29.5 | 29.2 | 29.8 | 28.8 |

| Component | Unit | Ex. e-12 | Ex. e-13 | Ex. e-14 | Ex. e-15 | Ex. e-16 | Ex. e-17 | Ex. e-18 | Ex. e-19 | Ex. e-20 | Ex. e-21 | Ex. e-22 |
|---|---|---|---|---|---|---|---|---|---|---|---|---|
| A-1 Component | Type | PBT-1 | PBT-2 | PBT-2 | PBT-2 | PBT-2 | PBT-2 | PBT-2 | PBT-1 | PBT-1 | PBT-2 | PBT-1 |
|  | Parts by weight | 100 | 100 | 100 | 100 | 100 | 100 | 100 | 100 | 100 | 100 | 100 |
| A-2 Component | Type | — | — | — | — | — | — | — | — | — | — | — |
|  | Parts by weight | — | — | — | — | — | — | — | — | — | — | — |
| B-2 Component | Type | FR-10 | FR-10 | FR-10 | FR-10 | FR-10 | FR-10 | FR-10 | FR-10 | FR-10 | FR-10 | FR-10 |
|  | Parts by weight | 10 | 8 | 10 | 10 | 10 | 10 | 10 | 10 | 15 | 10 | 10 |
| B-3 Component | Type | BC | BC | BC | BC | BC | BC | BC | BC | BC | BC | BC |
|  | Parts by weight | 0.5 | 0.8 | 0.5 | 1 | 1 | 1 | 1 | 0.5 | 0.3 | 0.5 | 0.5 |
| C Component | Type | — | — | — | — | — | — | — | C-1 | C-1 | C-1 | C-2 |
|  | Parts by weight | — | — | — | — | — | — | — | 1 | 1 | 1 | 1 |
| D Component | Type | — | — | — | D-1 | D-1 | D-2 | D-2 | — | — | — | — |
|  | Parts by weight | — | — | — | 25 | 42.9 | 25 | 42.9 | — | — | — | — |
| E Component | Type | — | — | — | — | — | — | — | — | — | — | — |
|  | Parts by weight | — | — | — | — | — | — | — | — | — | — | — |

TABLES 5-continued

| | Unit | Ex. e-23 | Ex. e-24 | Ex. e-25 | Ex. e-26 | Ex. e-27 | Ex. e-28 | Ex. e-29 | Ex. e-30 | Ex. e-31 | Ex. e-32 | Ex. e-33 |
|---|---|---|---|---|---|---|---|---|---|---|---|---|
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | V-0 | V-0 | V-0 | V-0 | V-0 | V-2 | V-2 | V-0 | V-0 | V-0 | V-0 |
| | Drips | Seen | Seen | Seen | Seen | Seen | Seen | Seen | Not seen | Not seen | Not seen | Not seen |
| | Ignition of cotton | Not seen | Not seen | Not seen | Not seen | Not seen | Seen | Seen | Not seen | Not seen | Not seen | Not seen |
| | L.O.I. | 29.3 | 29.0 | 29.2 | 29.8 | 29.5 | 23.2 | 22.5 | 30.2 | 30.5 | 30.3 | 30.5 |
| Component | | | | | | | | | | | | |
| A-1 Component | Type | PBT-1 | PBT-2 | PBT-2 | PBT-2 | PBT-2 | PBT-2 | PBT-2 | PBT-2 | PBT-2 | PBT-2 | PBT-2 |
| | Parts by weight | 100 | 71.4 | 71.4 | 71.4 | 71.4 | 71.4 | 71.4 | 100 | 100 | 100 | 100 |
| A-2 Component | Type | — | PPE | PPE | PC | PC | PA | PA | — | — | — | — |
| | Parts by weight | — | 28.6 | 28.6 | 28.6 | 28.6 | 28.6 | 28.6 | — | — | — | — |
| B-2 Component | Type | FR-10 | FR-10 | FR-10 | FR-10 | FR-10 | FR-10 | FR-10 | FR-10 | FR-10 | FR-10 | FR-10 |
| | Parts by weight | 10 | 20 | 20 | 20 | 20 | 20 | 20 | 40 | 40 | 40 | 40 |
| B-3 Component | Type | BC | BC | BC | BC | BC | BC | BC | BC | BC | BC | BC |
| | Parts by weight | 0.5 | 1 | 1 | 1 | 1 | 1 | 1 | 2 | 2 | 2 | 2 |
| C Component | Type | C-2 | — | — | — | — | — | — | C-3 | C-3 | C-4 | C-4 |
| | Parts by weight | 1 | — | — | — | — | — | — | 40 | 40 | 40 | 40 |
| D Component | Type | — | — | D-2 | D-2 | D-2 | D-2 | D-2 | D-2 | D-2 | D-2 | D-2 |
| | Parts by weight | — | — | 42.9 | 42.9 | 42.9 | 42.9 | 42.9 | 60 | 60 | 60 | 60 |
| E Component | Type | — | E-1 | E-1 | E-1 | E-1 | E-1 | E-1 | E-1 | E-2 | E-1 | E-2 |
| | Parts by weight | — | 1.4 | 1.4 | 1.4 | 1.4 | 1.4 | 1.4 | 2 | 2 | 2 | 2 |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | V-0 | V-0 | V-0 | V-0 | V-0 | V-0 | V-0 | V-0 | V-0 | V-0 | V-0 |
| | Drips | Seen | Not seen | Not seen | Not seen | Not seen | Not seen | Not seen | Not seen | Not seen | Not seen | Not seen |
| | Ignition of cotton | Not seen | Not seen | Not seen | Not seen | Not seen | Not seen | Not seen | Not seen | Not seen | Not seen | Not seen |
| | L.O.I. | 30.5 | 29.2 | 29.5 | 29.0 | 29.8 | 30.2 | 30.3 | 30.0 | 29.8 | 29.2 | 29.5 |

| | Unit | Ex. e-34 | Ex. e-35 | Ex. e-36 | Ex. e-37 | Ex. e-38 | Ex. e-39 | Ex. e-40 | Ex. e-41 | Ex. e-42 | Ex. e-43 | Ex. e-44 |
|---|---|---|---|---|---|---|---|---|---|---|---|---|
| Component | | | | | | | | | | | | |
| A-1 Component | Type | PBT-2 | PBT-2 | PBT-2 | PBT-2 | PBT-2 | PBT-2 | PBT-2 | PBT-2 | PBT-2 | PBT-2 | PBT-2 |
| | Parts by weight | 100 | 100 | 100 | 100 | 100 | 100 | 71.4 | 71.4 | 71.4 | 71.4 | 100 |
| A-2 Component | Type | — | — | — | — | — | — | PPE | PPE | PC | PA | — |
| | Parts by weight | — | — | — | — | — | — | 28.6 | 28.6 | 28.6 | 28.6 | — |
| B-2 Component | Type | FR-10 | FR-10 | FR-10 | FR-10 | FR-10 | FR-10 | FR-10 | FR-10 | FR-10 | FR-10 | FR-10 |
| | Parts by weight | 10 | 10 | 10 | 15 | 15 | 10 | 20 | 20 | 20 | 20 | 40 |
| B-3 Component | Type | BC | BC | BC | BC | BC | BC | BC | BC | BC | BC | BC |
| | Parts by weight | 0.5 | 0.3 | 0.5 | 0.3 | 1 | 1 | 1 | 1 | 1 | 1 | 2 |
| C Component | Type | — | — | — | — | — | — | — | — | — | — | C-3 |
| | Parts by weight | — | — | — | — | — | — | — | — | — | — | 40 |
| D Component | Type | — | — | — | D-1 | D-1 | — | D-2 | D-2 | D-2 | D-2 | D-2 |
| | Parts by weight | — | — | — | 25 | 42.9 | — | 42.9 | 42.9 | 42.9 | 42.9 | 60 |
| E Component | Type | — | — | — | — | — | — | E-1 | E-2 | E-1 | E-1 | E-1 |
| | Parts by weight | — | — | — | — | — | — | 1.4 | 1.4 | 1.4 | 1.4 | 2 |
| Flame retardancy | Thickness of specimen | 0.8 mm | 0.8 mm | 0.8 mm | 0.8 mm | 0.8 mm | 0.8 mm | 0.8 mm | 0.8 mm | 0.8 mm | 0.8 mm | 0.8 mm |
| | UL rating | V-0 | V-0 | V-0 | V-0 | V-0 | V-0 | V-0 | V-0 | V-0 | V-0 | V-0 |
| | Drips | Seen | Seen | Seen | Seen | Seen | Not seen | Not seen | Not seen | Not seen | Not seen | Not seen |
| | Ignition of cotton | Not seen | Not seen | Not seen | Not seen | Not seen | Not seen | Not seen | Not seen | Not seen | Not seen | Not seen |
| | L.O.I. | 29.8 | 30.3 | 29.5 | 29.8 | 29.5 | 29.2 | 29.5 | 29.8 | 29.8 | 30.2 | 30.0 |

Ex. = Example

TABLES 6

| Component | Unit | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 | C. Ex. 11 |
|---|---|---|---|---|---|---|---|---|---|---|---|---|
| A-1 Component | Type | PBT-1 | PBT-2 | PBT-1 | PBT-2 | PBT-1 | PBT-1 | PBT-2 | PET-2 | PBT-1 | PBT-1 | PBT-2 |
|  | Parts by weight | 100 | 100 | 100 | 100 | 100 | 100 | 100 | 100 | 100 | 100 | 100 |
| A-2 Component | Type | — | — | — | — | — | — | — | — | — | — | — |
|  | Parts by weight | — | — | — | — | — | — | — | — | — | — | — |
| Organic phosphorous compound | Type | FP-500 | FR-3 | — | — | TPP | TPP | TPP | TPP | FP-500 | FP-500 | FP-500 |
|  | Parts by weight | 25 | 15 | — | — | 5 | 25 | 5 | 25 | 5 | 25 | 5 |
| C Component | Type | — | — | — | — | — | — | — | — | — | — | — |
|  | Parts by weight | — | — | — | — | — | — | — | — | — | — | — |
| D Component | Type | — | — | — | — | — | — | — | — | — | — | — |
|  | Parts by weight | — | — | — | — | — | — | — | — | — | — | — |
| E Component | Type | — | — | — | — | — | — | — | — | — | — | — |
|  | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | notV | notV | notV | notV | V-2 | V-2 | V-2 | V-2 | V-2 | V-2 | V-2 |
|  | Drips | Seen | Seen | Seen | Seen | Seen | Seen | Seen | Seen | Seen | Seen | Seen |
|  | Ignition of cotton | Seen | Seen | Seen | Seen | Seen | Seen | Seen | Seen | Seen | Seen | Seen |
|  | L.O.I. | 23.2 | 22.2 | 21.3 | 20.7 | 25.1 | 26.1 | 25.3 | 26.0 | 24.8 | 25.9 | 24.8 |

| Component | Unit | C. Ex. 12 | C. Ex. 13 | C. Ex. 14 | C. Ex. 15 | C. Ex. 16 | C. Ex. 17 | C. Ex. 18 | C. Ex. 19 | C. Ex. 20 | C. Ex. 21 | C. Ex. 22 |
|---|---|---|---|---|---|---|---|---|---|---|---|---|
| A-1 Component | Type | PBT-2 | PBT-1 | PBT-1 | PBT-2 | PBT-2 | PBT-1 | PBT-1 | PBT-2 | PBT-2 | PBT-1 | PBT-1 |
|  | Parts by weight | 100 | 100 | 100 | 100 | 100 | 100 | 100 | 100 | 100 | 100 | 100 |
| A-2 Component | Type | — | — | — | — | — | — | — | — | — | — | — |
|  | Parts by weight | — | — | — | — | — | — | — | — | — | — | — |
| Organic phosphorous compound | Type | FP-500 | FR-3 | FR-3 | FR-3 | FR-3 | — | — | — | — | TPP | TPP |
|  | Parts by weight | 25 | 15 | 20 | 15 | 20 | — | — | — | — | 20 | 20 |
| C Component | Type | — | — | — | — | — | C-1 | C-2 | C-1 | C-2 | C-1 | C-2 |
|  | Parts by weight | — | — | — | — | — | 1 | 1 | 1 | 1 | 1 | 1 |
| D Component | Type | — | — | — | — | — | — | — | — | — | — | — |
|  | Parts by weight | — | — | — | — | — | — | — | — | — | — | — |
| E Component | Type | — | — | — | — | — | — | — | — | — | — | — |
|  | Parts by weight | — | — | — | — | — | — | — | — | — | — | — |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | V-2 | V-2 | V-2 | V-2 | V-2 | notV | notV | notV | notV | V-2 | V-2 |
|  | Drips | Seen | Seen | Seen | Seen | Seen | Seen | Seen | Seen | Seen | Seen | Seen |
|  | Ignition of cotton | Seen | Seen | Seen | Seen | Seen | Seen | Seen | Seen | Seen | Seen | Seen |
|  | L.O.I. | 26.2 | 26.5 | 27.0 | 26.7 | 26.8 | 22.5 | 22.3 | 22.0 | 22.2 | 25.5 | 25.3 |

TABLES 6-continued

| Component | | Unit | C. Ex. 23 | C. Ex. 24 | C. Ex. 25 | C. Ex. 26 | C. Ex. 27 | C. Ex. 28 | C. Ex. 29 | C. Ex. 30 | C. Ex. 31 | C. Ex. 32 | C. Ex. 33 |
|---|---|---|---|---|---|---|---|---|---|---|---|---|---|
| A-1 Component | Type | | PBT-1 | PBT-1 | PBT-2 | PBT-2 | PBT-2 | PBT-2 | PBT-2 | PET-2 | PBT-2 | PBT-2 | PBT-2 |
| | Parts by weight | | 100 | 100 | 100 | 100 | 100 | 100 | 100 | 100 | 100 | 100 | 100 |
| A-2 Component | Type | | — | — | — | — | — | — | — | — | — | — | — |
| | Parts by weight | | — | — | — | — | — | — | — | — | — | — | — |
| Organic phosphorous compound | Type | | FP-500 | FP-500 | TPP | TPP | FP-500 | FP-500 | — | — | — | — | TPP |
| | Parts by weight | | 20 | 20 | 20 | 20 | 20 | 20 | — | — | — | — | 28.6 |
| C Component | Type | | C-1 | C-2 | C-1 | C-2 | C-1 | C-2 | — | — | — | — | — |
| | Parts by weight | | 1 | 1 | 1 | 1 | 1 | 1 | — | — | — | — | — |
| D Component | Type | | — | — | — | — | — | — | D-1 | D-1 | D-2 | D-2 | D-2 |
| | Parts by weight | | — | — | — | — | — | — | 25 | 42.9 | 25 | 42.9 | 42.9 |
| E Component | Type | | — | — | — | — | — | — | — | — | — | — | — |
| | Parts by weight | | — | — | — | — | — | — | — | — | — | — | — |
| Flame retardancy | Thickness of specimen | | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | | V-2 | V-2 | V-2 | V-2 | V-2 | V-2 | notV | notV | notV | notV | V-2 |
| | Drips | | Seen | Seen | Seen | Seen | Seen | Seen | Seen | Seen | Seen | Seen | Seen |
| | Ignition of cotton | | Seen | Seen | Seen | Seen | Seen | Seen | Seen | Seen | Seen | Seen | Seen |
| | L.O.I. | | 25.2 | 25.0 | 25.2 | 25.3 | 25.7 | 25.5 | 22.0 | 21.8 | 20.0 | 19.8 | 25.6 |

| Component | | Unit | C. Ex. 34 | C. Ex. 35 | C. Ex. 36 | C. Ex. 37 | C. Ex. 38 | C. Ex. 39 | C. Ex. 40 | C. Ex. 41 | C. Ex. 42 | C. Ex. 43 | C. Ex. 44 |
|---|---|---|---|---|---|---|---|---|---|---|---|---|---|
| A-1 Component | Type | | PBT-2 | PBT-2 | PBT-2 | PBT-1 | PBT-1 | PBT-1 | PBT-1 | PBT-1 | PBT-1 | PBT-2 | PBT-2 |
| | Parts by weight | | 100 | 100 | 100 | 95 | 90 | 95 | 90 | 95 | 90 | 71.4 | 64.3 |
| A-2 Component | Type | | — | — | — | ABS | ABS | ABS | ABS | ABS | ABS | PPE | PPE |
| | Parts by weight | | — | — | — | 5 | 10 | 5 | 10 | 5 | 10 | 28.6 | 35.7 |
| Organic phosphorous compound | Type | | FP-500 | TPP | FP-500 | — | — | TPP | TPP | FP-500 | FP-500 | — | — |
| | Parts by weight | | 28.6 | 28.6 | 28.6 | — | — | 30 | 30 | 30 | 30 | — | — |
| C Component | Type | | — | — | — | — | — | — | — | — | — | — | — |
| | Parts by weight | | — | — | — | — | — | — | — | — | — | — | — |
| D Component | Type | | D-1 | D-2 | D-2 | — | — | — | — | — | — | D-2 | D-2 |
| | Parts by weight | | 42.9 | 42.9 | 42.9 | — | — | — | — | — | — | 42.9 | 42.9 |
| E Component | Type | | — | — | — | — | — | — | — | — | — | E-1 | E-1 |
| | Parts by weight | | — | — | — | — | — | — | — | — | — | 1.4 | 1.4 |
| Flame retardancy | Thickness of specimen | | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
| | UL rating | | notV | notV | notV | V-2 | notV | V-2 | notV | V-2 | V-2 | notV | notV |
| | Drips | | Seen | Seen | Seen | Seen | Seen | Seen | Seen | Seen | Seen | Not seen | Not seen |
| | Ignition of cotton | | Seen | Seen | Seen | Seen | Seen | Seen | Seen | Seen | Seen | Not seen | Not seen |
| | L.O.I. | | 26.3 | 22.3 | 22.5 | 22.0 | 21.3 | 25.3 | 25.8 | 26.2 | 26.8 | 21.2 | 23.0 |

TABLES 6-continued

| Component | Unit | C. Ex. 45 | C. Ex. 46 | C. Ex. 47 | C. Ex. 48 | C. Ex. 49 | C. Ex. 50 | C. Ex. 51 | C. Ex. 52 | C. Ex. 53 | C. Ex. 54 | C. Ex. 55 |
|---|---|---|---|---|---|---|---|---|---|---|---|---|
| A-1 Component | Type | PBT-2 | PBT-2 | PBT-2 | PBT-2 | PBT-2 | PBT-2 | PBT-2 | PBT-2 | PBT-2 | PBT-2 | PBT-2 |
|  | Parts by weight | 71.4 | 64.3 | 71.4 | 64.3 | 71.4 | 64.3 | 71.4 | 64.3 | 71.4 | 64.3 | 71.4 |
| A-2 Component | Type | PPE | PPE | PPE | PPE | PPE | PPE | PPE | PPE | PPE | PPE | PC |
|  | Parts by weight | 28.6 | 35.7 | 28.6 | 35.7 | 28.6 | 35.7 | 28.6 | 35.7 | 28.6 | 35.7 | 28.6 |
| Organic phosphorous compound | Type | — | — | TPP | TPP | FP-500 | FP-500 | TPP | TPP | FP-500 | FP-500 | — |
|  | Parts by weight | — | — | 42.9 | 42.9 | 42.9 | 42.9 | 42.9 | 42.9 | 42.9 | 42.9 | — |
| C Component | Type | — | — | — | — | — | — | — | — | — | — | — |
|  | Parts by weight | — | — | — | — | — | — | — | — | — | — | — |
| D Component | Type | D-2 | D-2 | D-2 | D-2 | D-2 | D-2 | D-2 | D-2 | D-2 | D-2 | D-2 |
|  | Parts by weight | 42.9 | 42.9 | 42.9 | 42.9 | 42.9 | 42.9 | 42.9 | 42.9 | 42.9 | 42.9 | 42.9 |
| E Component | Type | E-2 | E-2 | E-2 | E-1 | E-1 | E-2 | E-2 | E-2 | E-2 | E-2 | E-1 |
|  | Parts by weight | 1.8 | 1.8 | 1.8 | 1.4 | 1.4 | 1.8 | 1.8 | 1.8 | 1.8 | 1.8 | 1.4 |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | notV | notV | V-2 | V-2 | V-2 | V-2 | V-2 | V-2 | V-2 | V-2 | notV |
|  | Drips | Not seen | Seen | Seen | Seen | Seen | Seen | Seen | Seen | Seen | Seen | Seen |
|  | Ignition of cotton | Not seen | Seen | Seen | Seen | Seen | Seen | Seen | Seen | Seen | Seen | Seen |
| L.O.I. |  | 21.0 | 23.2 | 25.3 | 26.9 | 25.6 | 27.3 | 25.4 | 27.1 | 25.4 | 27.1 | 20.8 |

| Component | Unit | C. Ex. 56 | C. Ex. 57 | C. Ex. 58 | C. Ex. 59 | C. Ex. 60 | C. Ex. 61 | C. Ex. 62 | C. Ex. 63 | C. Ex. 64 | C. Ex. 65 | C. Ex. 66 |
|---|---|---|---|---|---|---|---|---|---|---|---|---|
| A-1 Component | Type | PBT-2 | PBT-2 | PBT-2 | PBT-2 | PBT-2 | PBT-2 | PBT-2 | PBT-2 | PBT-2 | PBT-2 | PBT-2 |
|  | Parts by weight | 64.3 | 71.4 | 64.3 | 64.3 | 64.3 | 64.3 | 64.3 | 71.4 | 64.3 | 71.4 | 64.3 |
| A-2 Component | Type | PC | PC | PC | PC | PC | PC | PC | PA | PA | PA | PA |
|  | Parts by weight | 35.7 | 28.6 | 35.7 | 35.7 | 35.7 | 35.7 | 35.7 | 28.6 | 35.7 | 28.6 | 35.7 |
| Organic phosphorous compound | Type | — | — | — | TPP | FP-500 | FP-500 | FP-500 | — | — | — | — |
|  | Parts by weight | — | — | — | 42.9 | 42.9 | 42.9 | 42.9 | — | — | — | — |
| C Component | Type | — | — | — | — | — | — | — | — | — | — | — |
|  | Parts by weight | — | — | — | — | — | — | — | — | — | — | — |
| D Component | Type | D-2 | D-2 | D-2 | D-2 | D-2 | D-2 | D-2 | D-2 | D-2 | D-2 | D-2 |
|  | Parts by weight | 42.9 | 42.9 | 42.9 | 42.9 | 42.9 | 42.9 | 42.9 | 42.9 | 42.9 | 42.9 | 42.9 |
| E Component | Type | E-2 | E-2 | E-2 | E-1 | E-2 | E-2 | E-2 | E-1 | E-1 | E-2 | E-2 |
|  | Parts by weight | 1.8 | 1.8 | 1.8 | 1.4 | 1.8 | 1.8 | 1.8 | 1.4 | 1.4 | 1.8 | 1.8 |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | notV | notV | notV | V-2 | V-2 | V-2 | V-2 | notV | notV | notV | notV |
|  | Drips | Seen | Seen | Seen | Seen | Seen | Seen | Seen | Seen | Seen | Seen | Seen |
|  | Ignition of cotton | Seen | Seen | Seen | Seen | Seen | Seen | Seen | Seen | Seen | Seen | Seen |
| L.O.I. |  | 21.1 | 21.3 | 21.3 | 28.2 | 28.3 | 28.5 | 28.7 | 21.5 | 21.8 | 21.7 | 22.2 |

TABLES 6-continued

| Component | Unit | C. Ex. 67 | C. Ex. 68 | C. Ex. 69 | C. Ex. 70 | C. Ex. 71 | C. Ex. 72 | C. Ex. 73 | C. Ex. 74 | C. Ex. 75 | C. Ex. 76 | C. Ex. 77 |
|---|---|---|---|---|---|---|---|---|---|---|---|---|
| A-1 Component | Type | PBT-2 | PBT-2 | PBT-2 | PBT-2 | PBT-2 | PBT-2 | PBT-2 | PBT-2 | PBT-2 | PBT-2 | PBT-2 |
|  | Parts by weight | 64.3 | 64.3 | 64.3 | 64.3 | 100 | 100 | 100 | 100 | 100 | 100 | 100 |
| A-2 Component | Type | PA | PA | PA | PA | — | — | — | — | — | — | — |
|  | Parts by weight | 35.7 | 35.7 | 35.7 | 35.7 | — | — | — | — | — | — | — |
| Organic phosphorous compound | Type | TPP | FP-500 | TPP | FP-500 | — | — | — | — | TPP | TPP | TPP |
|  | Parts by weight | 42.9 | 42.9 | 42.9 | 42.9 | — | — | — | — | 60 | 60 | 60 |
| C Component | Type | — | — | — | — | C-3 | C-4 | C-3 | C-4 | C-3 | C-4 | C-3 |
|  | Parts by weight | — | — | — | — | 40 | 40 | 40 | 40 | 40 | 40 | 40 |
| D Component | Type | D-2 | D-2 | D-2 | D-2 | D-2 | D-2 | D-2 | D-2 | D-2 | D-2 | D-2 |
|  | Parts by weight | 42.9 | 42.9 | 42.9 | 42.9 | 60 | 60 | 60 | 60 | 60 | 60 | 60 |
| E Component | Type | E-1 | E-1 | E-2 | E-2 | E-1 | E-1 | E-2 | E-2 | E-1 | E-1 | E-2 |
|  | Parts by weight | 1.4 | 1.4 | 1.8 | 1.8 | 2 | 2 | 2 | 2 | 2 | 2 | 2 |
| Flame retardancy | Thickness of specimen | 1.6 mm | 1.6 mm | 1.6 mm | 1.6 mm | 1.6 mm | 1.6 mm | 1.6 mm | 1.6 mm | 1.6 mm | 1.6 mm | 1.6 mm |
|  | UL rating | V-2 | V-2 | V-2 | V-2 | notV | notV | notV | notV | V-2 | V-2 | V-2 |
|  | Drips | Seen | Seen | Seen | Seen | Seen | Seen | Seen | Seen | Seen | Seen | Seen |
|  | Ignition of cotton | Seen | Seen | Seen | Seen | Seen | Seen | Seen | Seen | Seen | Seen | Seen |
|  | L.O.I. | 26.3 | 26.7 | 26.3 | 26.8 | 22.0 | 22.3 | 22.2 | 21.8 | 26.8 | 26.7 | 26.5 |

| Component | Unit | C. Ex. 78 | C. Ex. 79 | C. Ex. 80 | C. Ex. 81 | C. Ex. 82 |
|---|---|---|---|---|---|---|
| A-1 Component | Type | PBT-2 | PBT-2 | PBT-2 | PBT-2 | PBT-2 |
|  | Parts by weight | 100 | 100 | 100 | 100 | 100 |
| A-2 Component | Type | — | — | — | — | — |
|  | Parts by weight | — | — | — | — | — |
| Organic phosphorous compound | Type | TPP | FP-500 | FP-500 | FP-500 | FP-500 |
|  | Parts by weight | 60 | 60 | 60 | 60 | 60 |
| C Component | Type | C-4 | C-3 | C-4 | C-3 | C-4 |
|  | Parts by weight | 40 | 40 | 40 | 40 | 40 |
| D Component | Type | D-2 | D-2 | D-2 | D-2 | D-2 |
|  | Parts by weight | 60 | 60 | 60 | 60 | 60 |
| E Component | Type | E-2 | E-1 | E-1 | E-2 | E-2 |
|  | Parts by weight | 2 | 2 | 2 | 2 | 2 |
| Flame retardancy | Thickness of specimen | 1.6 mm | 1.6 mm | 1.6 mm | 1.6 mm | 1.6 mm |
|  | UL rating | V-2 | V-2 | V-2 | V-2 | V-2 |
|  | Drips | Seen | Seen | Seen | Seen | Seen |
|  | Ignition of cotton | Seen | Seen | Seen | Seen | Seen |
|  | L.O.I. | 26.8 | 27.0 | 26.5 | 26.8 | 27.2 |

C. Ex. = Comparative Example

As for the compositions of Examples a-1 to a-3, a-6 and a-7 in Table 1, 0.8 mm-thick transparent test specimens were obtained by molding at a cylinder temperature of 270° C. and a mold temperature of 0° C. in Examples a-1 to a-3 and at a cylinder temperature of 250° C. and a mold temperature of 30° C. in Examples a-6 and a-7. When the total light transmittances of these test specimens were measured, they were 85% (a-1), 84% (a-2), 84% (a-3), 89% (a-6) and 90% (a-7).

MVR's measured under a load of 3.8 kg at 230° C. of the pellets of Examples a-1 and a-2 were 24.5 cm³/10 min and 24.3 cm³/10 min, respectively, which means that they were excellent in fluidity with high practical applicability.

Further, when MVR's of the pellets of Examples a-1 and a-2 were measured after they were treated at 130° C. for 24 hours, they were 24.1 cm³/10 mm and 25.2 cm³/10 min respectively, which means that resin decomposition did not take place. ΔY of the pellet of Example a-1 was 1.6% and ΔY of the pellet of Example a-2 was 3.7%.

Meanwhile, when MVR's of the pellets of Comparative Examples 13 and 14 in Table 6 were measured before and after they were heated at 130° C. for 24 hours, they were 50.8 cm³/10 min and 52.5 cm³/10 mm before heating and 62.5 cm³/10 mm and 65.3 cm³/10 min after heating, respectively, which means that resin decomposition was promoted. ΔY of the pellet of Comparative Example 13 was 23.0% and ΔY of the pellet of Comparative Example 14 was 24.4%.

As for the compositions of Examples b-1 to b-5 in Table 2, 0.8 mm-thick transparent test specimens were obtained by molding at a cylinder temperature of 270° C. and a mold temperature of 0° C. in Examples b-1 to b-3 and at a cylinder temperature of 250° C. and a mold temperature of 30° C. in Examples b-4 and b-5. When the total light transmittances of the test specimens were measured, they were 84% (b-1), 83% (b-2), 84% (b-3), 90% (b-4) and 92% (b-5).

MVR measured under a load of 3.8 kg at 230° C. of the pellet of Example b-1 was 27.5 cm³/10 min, which means that it was excellent in fluidity with high practical applicability. When MVR of the pellet of Example b-1 was measured after it was heated at 130° C. for 24 hours, it was 26.8 cm³/10 min, which means that resin decomposition did not take place. ΔY of the pellet of Example b-1 was 2.5%.

As for the compositions of Examples c-1 to c-4, c-7 and c-8 in Table 3, 0.8 mm-thick transparent test specimens were obtained by molding at a cylinder temperature of 270° C. and a mold temperature of 0° C. in Examples c-1 to c-4 and at a cylinder temperature of 250° C. and a mold temperature of 30° C. in Examples c-7 and c-8. When the total light transmittances of the test specimens were measured, they were 87% (c-1), 86% (c-2), 85% (c-3), 93% (c-7) and 95% (c-8).

MVR's measured under a load of 3.8 kg at 230° C. of the pellets of Examples c-1 and c-2 were 30.0 cm³/10 mm and 36.4 cm³/10 min, respectively, which means that they were excellent in fluidity with high practical applicability.

When MVR's of the pellets of Examples c-1 and c-2 were measured after they were heated at 130° C. for 24 hours, they were 30.5 cm³/10 min and 35.6 cm³/10 min, which means that resin decomposition did not take place. ΔY of the pellet of Example c-1 was 1.7%, and ΔY of the pellet of Example c-2 was 2.2%.

MVR measured under a load of 3.8 kg at 230° C. of the pellet of Example d-1 in Table 4 was 13.4 cm³/10 min, which means that it was excellent in fluidity with high practical applicability. When MVR of the pellet of Example d-1 was measured after it was heated at 130° C. for 24 hours, it was 13.8 cm³/10 min, which means that resin decomposition did not take place. ΔY of the pellet of Example d-1 was 3.0%.

Effect of the Invention

The flame retardant resin composition and molded article formed therefrom of the present invention have the following advantages compared with the flame retardant polyester resin composition of the prior art.

(i) A polyester resin composition having high flame retardancy is obtained without using substantially a halogen-containing flame retardant.

(ii) Since an organic phosphorus compound as a flame retardant has an excellent flame retarding effect for a polyester resin, V-2 flame retardancy is achieved with a relatively small amount of the organic phosphorus compound. A composition having V-0 flame retardancy is easily obtained. That is, a V-0 flame retardant composition is obtained with a relatively simple composition without the need of adding a large number of components for attaining V-0 rating.

(iii) A polyester composition having V-0 flame retardancy is easily obtained by combining an organic phosphorus compound as a flame retardant with a specific flame retardancy improving resin and blending a relatively small amount of the organic phosphorus compound.

(iv) There is obtained a resin composition which rarely experiences the deterioration of a polyester resin and has excellent heat stability at the time of molding a polyester resin or using a molded article due to the structure and characteristic properties of an organic phosphorus compound used as a flame retardant. Therefore, a composition having good balance among flame retardancy, mechanical strength and heat stability is obtained.

(v) Since an organic phosphorus compound as a flame retardant is achromatic and compatible with a polyester resin, a molded article having excellent transparency can be obtained. A polyester resin molded article having V-0 flame retardancy and excellent transparency has not been available on the market.

What is claimed is:

1. A flame retardant resin composition consisting essentially of:
(A) 100 parts by weight of the total of resin components (components A) which include at least 60 wt % of an aromatic polyester resin;
(B) 1 to 100 parts by weight of an organic phosphorus compound represented by the following general formula (1) and having an acid value of 0.7 mgKOH/g or less (component B-1);
(C) 0 to 50 parts by weight of a flame retardancy improving resin (component C);
(D) 0 to 200 parts by weight of a filler (component D); and
(E) 0.01 to 10 parts by weight of a fluorine-containing resin (component E):

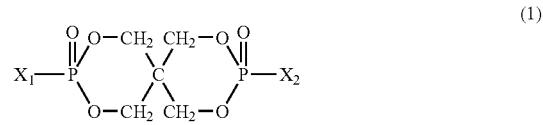

(1)

wherein $X_1$ and $X_2$ are the same or different and each an aromatic substituted alkyl group represented by the formula $-(AL)-(Ar)_n$ (AL is a branched or linear aliphatic hydrocarbon group having 1 to 5 carbon atoms, Ar is a phenyl group, napthyl group or anthryl group, and n is an integer of 1 to 3, and Ar may be bonded to any carbon atom of AL).

2. A flame retardant which is an organic phosphorus compound represented by the following formula (1-d):

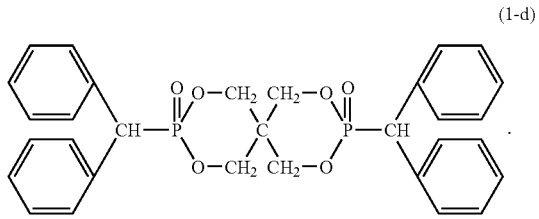

(1-d)

3. A flame retardant aromatic polyester resin composition containing an organic phosphorus compound represented by formula (1-d) of claim 2 in an effective amount as a flame retardant.

4. A flame retardant resin composition consisting essentially of:
(A) 100 parts by weight of the total of resin components (components A) which include at least 60 wt % of an aromatic polyester resin;
(B) 5 to 30 parts by weight of an organic phosphorus compound (component B-2) represented by the following general formula (2) and 0.01 to 5 parts by weight of a biscumyl compound (component B-3) represented by the following general formula (3);
(C) 0 to 50 parts by weight of a flame retardancy improving resin (component C); and
(D) 0 to 200 parts by weight of a filler (component D):

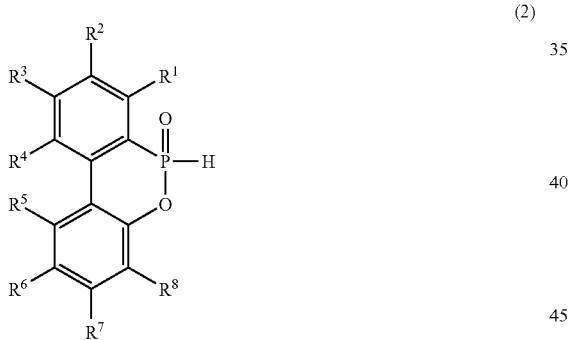

(2)

wherein $R^1$ to $R^8$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y—(—Y— is O—, —S— or alkylene group having 1 to 8 carbon atoms, and $Ar^3$ is an aryl group having 6 to 15 carbon atoms),

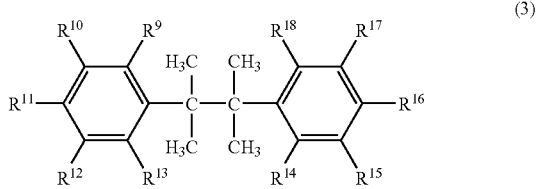

(3)

wherein $R^9$ to $R^{18}$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y—(—Y— is O—, —S— or alkylene group having 1 to 8 carbon atoms, and $Ar^3$ is an aryl group having 6 to 15 carbon atoms).

5. A flame retardant resin composition consisting essentially of:
(A) 100 parts by weight of the total of resin components (components A) which include at least 60 wt % of an aromatic polyester resin;
(B) 5 to 30 parts by weight of an organic phosphorus compound (component B-2) represented by the following general formula (2) and 0.01 to 5 parts by weight of a biscumyl compound (component B-3) represented by the following general formula (3);
(C) 0 to 50 parts by weight of a flame retardancy improving resin (component C);
(D) 0 to 200 parts by weight of a filler (component D); and
E) 0.01 to 10 parts by weight of a fluorine-containing resin (component E);

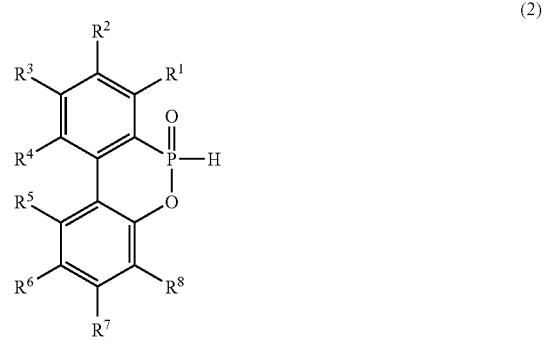

(2)

wherein $R^1$ to $R^8$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y—(—Y is —O—, —S— or alkylene group having 1 to 8 carbon atoms, and $Ar^3$ is an aryl group having 6 to 15 carbon atoms),

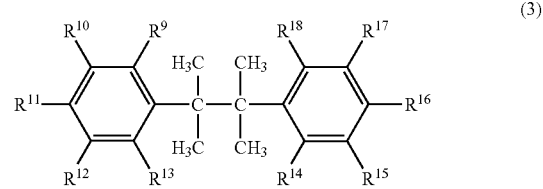

(3)

wherein $R^9$ to $R^{18}$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y—(—Y— is O—, —S— or alkylene group having 1 to 8 carbon atoms, and $Ar^3$ is an aryl group having 6 to 15 carbon atoms).

6. The flame retardant resin composition of claim 4, wherein the aromatic polyester resin (A) is at least one selected from the group consisting of polyethylene terephthalate resin, polybutylene terephthalate resin, polyethylene naphthalate resin, polybutylene naphthalate resin, polycyclohexanedimethyl terephthalate resin, polytrimethylene terephthalate resin and polytrimethylene naphthalate resin.

7. The flame retardant resin composition of claim 4, wherein the aromatic polyester resin (A) is at least one selected from the group consisting of polyethylene terephthalate resin, polybutylene terephthalate resin and polyethylene naphthalate resin.

8. The flame retardant resin composition of claim 4, wherein the components A consist of 60 to 100 parts by weight of an aromatic polyester resin (component A-1) and 40 to 0 part by weight of at least one thermoplastic resin (component A-2) selected from the group consisting of polyphenylene ether resin, polycarbonate resin, polyamide resin, polyolefin resin, styrene-based resin, polyphenylene sulfide resin and polyether imide resin.

9. The flame retardant resin composition of claim 4, wherein the total amount of the components B-2 and B-3 is 6 to 33 parts by weight based on 100 parts by weight of the total of the components A.

10. The flame retardant resin composition of claim 4, wherein the weight ratio of the component B-2 to the component B-3 is in the range of 4/1 to 70/1.

11. The flame retardant resin composition of claim 4, wherein the flame retardancy improving resin (C) (component C) is at least one selected from the group consisting of phenolic resin, epoxy resin and styrene-based resin and contained in an amount of 0.01 to 45 parts by weight based on 100 parts by weight of the total of the components A.

12. The flame retardant resin composition of claim 4, wherein the filler (D) (component D) is contained in an amount of 1 to 150 parts by weight based on 100 parts by weight of the total of the components A.

13. The flame retardant resin composition of claim 4 which contains substantially no halogen.

14. The flame retardant resin composition of claim 4 which provides a 1.6 mm-thick molded article having UL-94 V-0 flame retardancy.

15. A method of imparting flame retardancy to an aromatic polyester resin, which comprises mixing an effective amount of an organic phosphorus compound (component B-2) represented by formula (2) and a biscumyl compound (component B-3) represented by formula (3) with the aromatic polyester resin,

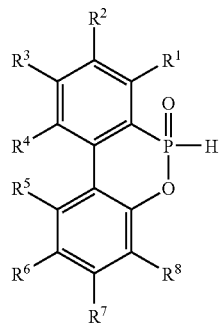

(2)

wherein $R^1$ to $R^8$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y—(—Y— is —O—, —S— or alkylene group having 1 to 8 carbon atoms, and $Ar^3$ is an aryl group having 6 to 15 carbon atoms),

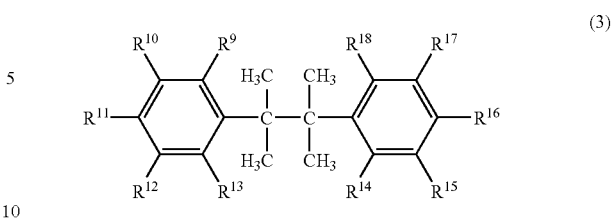

(3)

wherein $R^9$ to $R^{18}$ may be the same or different and each a hydrogen atom, alkyl group having 1 to 12 carbon atoms, alkyloxy group having 1 to 12 carbon atoms, alkylthio group having 1 to 12 carbon atoms or group represented by $Ar^3$—Y—(—Y— is —O—, —S— or alkylene group having 1 to 8 carbon atoms, and $Ar^3$ is an aryl group having 6 to 15 carbon atoms).

16. A molded article formed from the flame retardant resin composition of any one of claims 1, 4 and 5.

17. The flame retardant resin composition of claim 1 which contains substantially no halogen.

18. The flame retardant resin composition of claim 1 which provides a 1.6 mm-thick molded article having UL-94 V-0 flame retardancy.

19. The flame retardant resin composition of claim 1 which provides a 0.8 mm-thick molded article having UL-94 V-0 flame retardancy.

20. The flame retardant resin composition of claim 1 which has a heat stability (MVR change rate) of 20% or less.

21. The flame retardant resin composition of claim 5, wherein the aromatic polyester resin (A) is at least one selected from the group consisting of polyethylene terephthalate resin, polybutylene terephthalate resin, polyethylene naphthalate resin, polybutylene naphthalate resin, polycyclohexanedimethyl terephthalate resin, polytrimethylene terephthalate resin and polytrimethylene naphthalate resin.

22. The flame retardant resin composition of claim 5, wherein the aromatic polyester resin (A) is at least one selected from the group consisting of polyethylene terephthalate resin, polybutylene terephthalate resin and polyethylene naphthalate resin.

23. The flame retardant resin composition of claim 5, wherein the components A consist of 60 to 100 parts by weight of an aromatic polyester resin (component A-1) and 40 to 0 part by weight of at least one thermoplastic resin (component A-2) selected from the group consisting of polyphenylene ether resin, polycarbonate resin, polyamide resin, polyolefin resin, styrene-based resin, polyphenylene sulfide resin and polyether imide resin.

24. The flame retardant resin composition of claim 5, wherein the total amount of the components B-2 and B-3 is 6 to 33 parts by weight based on 100 parts by weight of the total of the components A.

25. The flame retardant resin composition of claim 5, wherein the weight ratio of the component B-2 to the component B-3 is in the range of 4/1 to 70/1.

26. The flame retardant resin composition of claim 5, wherein the flame retardancy improving resin (C) (component C) is at least one selected from the group consisting of phenolic resin, epoxy resin and styrene-based resin and contained in an amount of 0.01 to 45 parts by weight based on 100 parts by weight of the total of the components A.

27. The flame retardant resin composition of claim 5, wherein the filler (D) (component D) is contained in an amount of 1 to 150 parts by weight based on 100 parts by weight of the total of the components A.

28. The flame retardant resin composition of claim 5, which contains substantially no halogen.

29. The flame retardant resin composition of claim 5, which provides a 1.6 mm-thick molded article having UL-94 V-0 flame retardancy.

30. The flame retardant resin composition of claim 1, wherein the organic phosphorus compound has an acid value of 0.5 mgKOH/g or less.

31. The flame retardant resin composition of claim 1, wherein the organic phosphorus compound has an acid value of 0.4 mgKOH/g or less.

* * * * *